(12) United States Patent
Shinozaki et al.

(10) Patent No.: US 10,691,550 B2
(45) Date of Patent: Jun. 23, 2020

(54) STORAGE CONTROL APPARATUS AND STORAGE CONTROL METHOD

(71) Applicant: FUJITSU LIMITED, Kawasaki-shi, Kanagawa (JP)

(72) Inventors: Yoshinari Shinozaki, Kawasaki (JP); Takeshi Watanabe, Kawasaki (JP); Norihide Kubota, Kawasaki (JP); Yoshihito Konta, Kawasaki (JP); Toshio Kikuchi, Sagamihara (JP); Naohiro Takeda, Zushi (JP); Yusuke Kurasawa, Nagano (JP); Yuji Tanaka, Inagi (JP); Marino Kajiyama, Yokohama (JP); Yusuke Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/955,745

(22) Filed: Apr. 18, 2018

(65) Prior Publication Data

US 2018/0307565 A1    Oct. 25, 2018

(30) Foreign Application Priority Data

Apr. 20, 2017 (JP) ................................. 2017-083354

(51) Int. Cl.
*G06F 11/14* (2006.01)
*G06F 3/06* (2006.01)
*G06F 12/0866* (2016.01)

(52) U.S. Cl.
CPC .......... *G06F 11/1451* (2013.01); *G06F 3/065* (2013.01); *G06F 3/067* (2013.01);
(Continued)

(58) Field of Classification Search
CPC ............. G06F 11/1451; G06F 11/1435; G06F 11/1456; G06F 11/1453; G06F 12/0866;
(Continued)

(56) References Cited

U.S. PATENT DOCUMENTS 5,893,152 A * 4/1999 Fuller ................... G06F 11/141
711/141
7,752,491 B1 * 7/2010 Liikanen ............. G06F 11/2087
714/6.13
(Continued)

FOREIGN PATENT DOCUMENTS

JP    2009-87021 A    4/2009
JP    2009-251725    10/2009
(Continued)

OTHER PUBLICATIONS

Japanese Office Action dated May 21, 2019 for corresponding Japanese Patent Application No. 2017-083354, with English Translation, 8 pages.

*Primary Examiner* — Hiep T Nguyen
(74) *Attorney, Agent, or Firm* — Fujitsu Patent Center

(57) ABSTRACT

A storage control apparatus includes a memory configured to store meta-information for associating addresses of a logical area and a physical area with each other, and a processor coupled to the memory and configured to read out first meta-information corresponding to a first logical area from the memory, specify a first address of the physical area corresponding to a copy source address of the data based on the first meta-information, read out second meta-information corresponding to a second logical area that is set as a copy destination of the data in the logical area from the memory, specify a second address of the physical area corresponding to a copy destination address of the data based on the second meta-information, and execute copy of the data by associ- (Continued)

ating the first address and the second address with each other as storage areas of the data.

6 Claims, 23 Drawing Sheets

(52) U.S. Cl.
CPC .......... *G06F 3/0608* (2013.01); *G06F 3/0641* (2013.01); *G06F 3/0658* (2013.01); *G06F 11/1435* (2013.01); *G06F 12/0866* (2013.01); *G06F 11/1453* (2013.01); *G06F 11/1456* (2013.01); *G06F 2201/84* (2013.01); *G06F 2212/262* (2013.01)

(58) Field of Classification Search
CPC ........ G06F 3/067; G06F 3/0658; G06F 3/065; G06F 3/0608; G06F 3/0641; G06F 2201/84
See application file for complete search history.

(56) References Cited

U.S. PATENT DOCUMENTS

| | | | |
|---|---|---|---|
| 2009/0089483 | A1 | 4/2009 | Tanaka et al. |
| 2009/0254507 | A1 | 10/2009 | Hosoya et al. |
| 2010/0070724 | A1 | 3/2010 | Ito et al. |
| 2012/0005557 | A1 | 1/2012 | Mardiks et al. |
| 2012/0017060 | A1 | 1/2012 | Kapanipathi et al. |
| 2012/0215964 | A1* | 8/2012 | Kaneko ............... G06F 12/0246 711/103 |
| 2014/0082308 | A1 | 3/2014 | Naruse et al. |
| 2015/0058527 | A1* | 2/2015 | Venkata .............. G06F 12/0873 711/103 |
| 2017/0075615 | A1* | 3/2017 | Imazaki ................ G06F 11/108 |

FOREIGN PATENT DOCUMENTS

| | | |
|---|---|---|
| JP | 2010-72746 | 4/2010 |
| JP | 2014-63289 A | 4/2014 |

* cited by examiner

※ DATA IS REARRANGED TO BE DISPERSED TO RESPECTIVE NODES WHEN MORE NODES ARE INSTALLED.

FIG. 7

| Offset | Byte0 | Byte1 | Byte2 | Byte3 |
|---|---|---|---|---|
| | | | | (8 byte) |
| 0x00 | Disk Pool No. | Reserved | RAID Unit Offset LBA | |
| 0x04 | RAID Unit No. | | | |

| Offset | Byte0 | Byte1 | Byte2 | Byte3 |
|---|---|---|---|---|
| 0x00 | Version | Status | Reserved | |
| 0x04 | LUN | | LBA (Upper 2 byte) | |
| 0x08 | LBA (Lower 4 byte) | | | |
| 0x0c | Compression Byte Count | | Reserved | |
| 0x10 | Node No. | | Disk Pool No. | Reserved |
| 0x14 | RAID Unit No. | | | |
| 0x18 | RAID Unit LBA | | BID (Upper 2 byte) | |
| 0x1c | BID (Lower 4 byte) | | | |

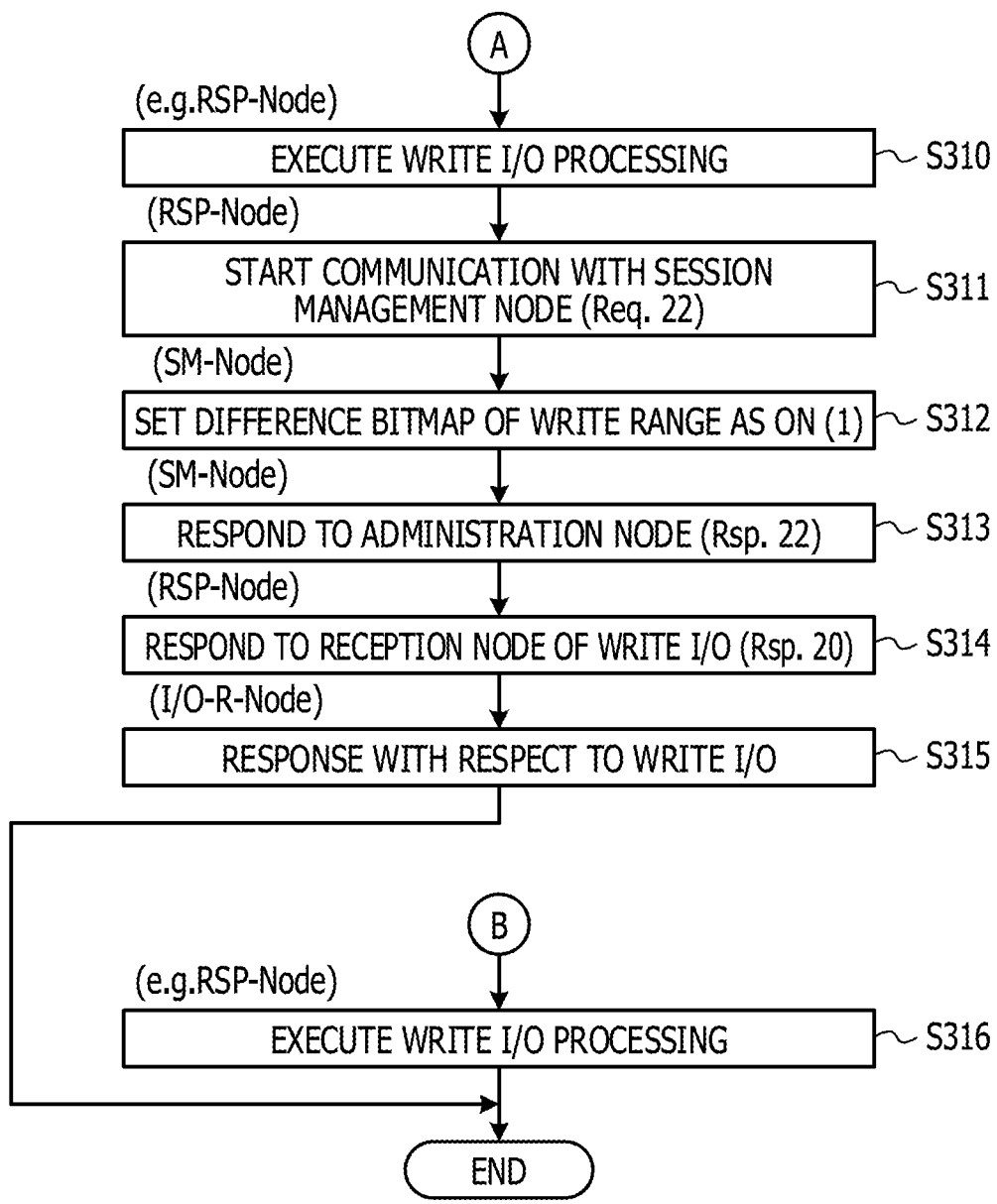

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2017-83354, filed on Apr. 20, 2017, the entire contents of which are incorporated herein by reference.

FIELD

The embodiments discussed herein are related to storage control technology.

BACKGROUND

A large volume of data dealt with by a server apparatus such as a business server is managed by a storage system including a storage apparatus having a large memory capacity, for example. Input/output (I/O) of data is processed by using a logical memory area (logical area) and a memory area (physical area) of a memory device mounted to the storage apparatus in the storage system.

The memory device includes, for example, a recording medium such as a hard disk drive (HDD) or a solid state drive (SSD), a device based on redundant arrays of inexpensive disks (RAID) using a plurality of recording media in combination, or the like. A technology for integrating physical areas of a plurality of memory devices to be used as a single virtual physical area (storage pool/disk pool) is also proposed. In the case of a storage apparatus having a cache installed, the cache may be temporarily used as the physical area in some cases.

An access to data by the server apparatus is executed via the logical area. When data write is performed with respect to a certain logical area, the storage apparatus writes the data at an address (physical address) of the physical area corresponding to an address (logical address) of the logical area at which the data is to be written. At this time, even when other data having the same contents as the newly written data exists in the physical area, in a case where the logical address at the write destination is different from the logical address of the other data, the data is written at a physical address different from that of the other data.

Since the capacity of the physical area provided by a hardware resource such as the HDD or the SSD is limited, a method of efficiently using the physical area by associating a plurality of logical addresses with the same physical address is proposed in a case where the data having the same contents is written at the plurality of logical addresses. This method may be referred to as duplication exclusion in some cases.

A method of determining the presence of the same data by using hash values of data at the time of snapshot creation is proposed in a storage system where a snapshot of the memory area at a certain time point is created. According to this method, in a case where the same data exists, the data already present at the time of the snapshot creation is used. In addition, a method of excluding the duplicate data in accordance with a comparison result by comparing mutual data in a case where the hash values are the same is proposed.

Japanese Laid-open Patent Publication No. 2010-72746 and Japanese Laid-open Patent Publication No. 2009-251725 discuss related art technologies.

SUMMARY

According to an aspect of the invention, a storage control apparatus includes a memory configured to store meta-information for associating addresses of a logical area and a physical area with each other, and a processor coupled to the memory and configured to read out first meta-information corresponding to a first logical area that is set as a copy source of data in the logical area from the memory, specify a first address of the physical area corresponding to a copy source address of the data based on the first meta-information, read out second meta-information corresponding to a second logical area that is set as a copy destination of the data in the logical area from the memory, specify a second address of the physical area corresponding to a copy destination address of the data based on the second meta-information, and execute copy of the data by associating the first address and the second address with each other as storage areas of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an explanatory diagram for describing a structure and contents of meta-address information;

FIG. 8 is an explanatory diagram for describing a structure and contents of meta-information;

FIG. 23 is a second flow chart illustrating the flow of the write I/O processing (WRITE during copy) during the duplication exclusion copy according to the second exemplary embodiment.

DESCRIPTION OF EMBODIMENTS

In a case where data copy is executed between logical areas, data of a copy target is written at a physical address corresponding to a logical address of a copy destination. For this reason, data at a copy source and data at the copy destination are stored in a physical area. However, the data at the copy source and the data at the copy destination are the same data. Similarly as in a case where the data is copied between two logical addresses in the same logical address, the same data is stored at two physical addresses respectively corresponding to the two logical addresses. The physical area can be efficiently used when the above-described duplication exclusion is executed after the copy, but loads for processing the duplicate data occur.

According to an aspect, the present disclosure aims at providing a storage control apparatus that can reduce the processing loads accompanied by the duplication exclusion and a storage control program.

Hereinafter, exemplary embodiments of the present disclosure will be described with reference to the accompanying drawings. It is noted that elements substantially having the same function in the present specification and the drawings may be assigned with the same reference signs to omit duplicated descriptions in some cases.

1. First Exemplary Embodiment

Figure 1:
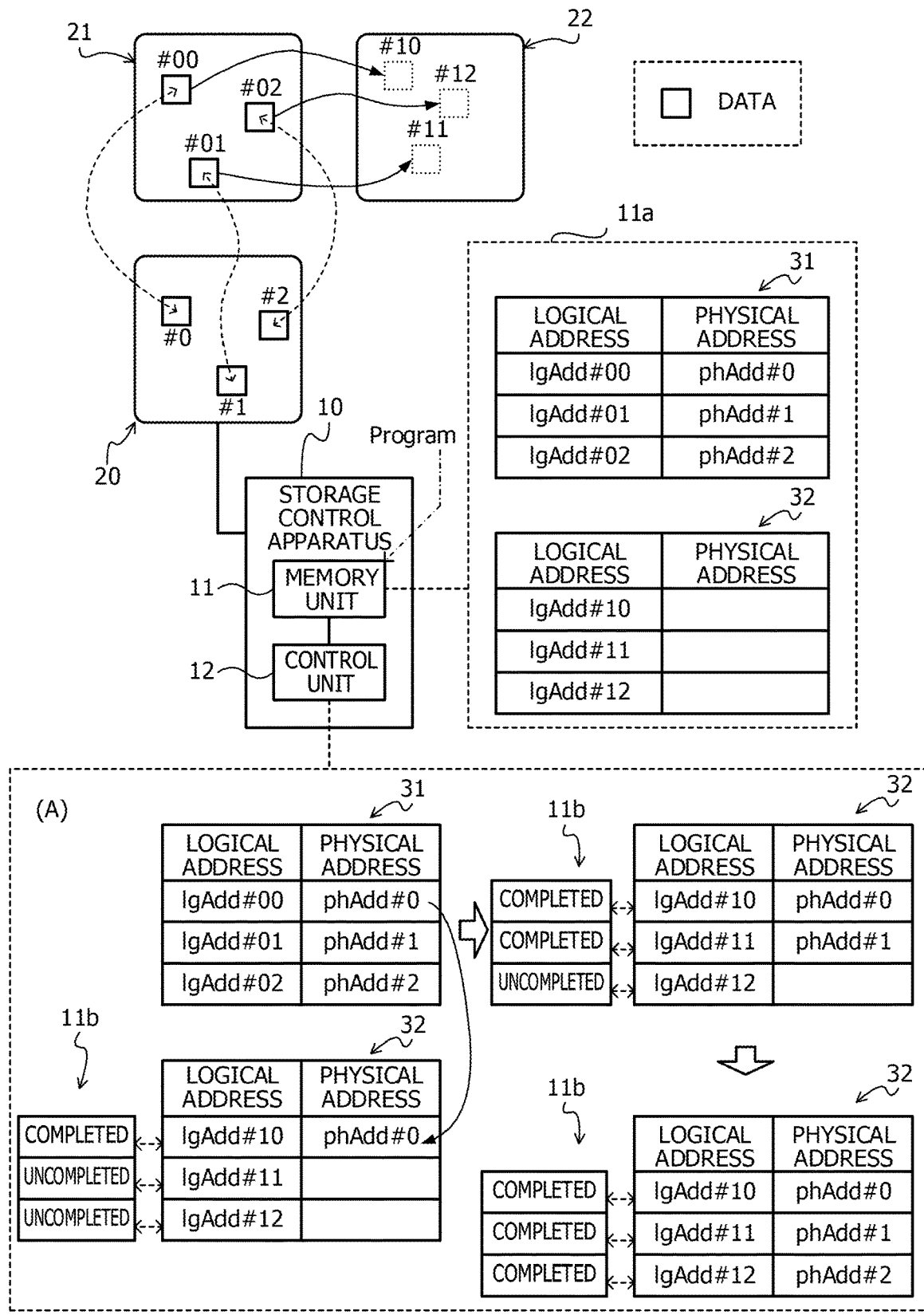
FIG. 1 illustrates an example of a storage control apparatus according to a first exemplary embodiment.

A first exemplary embodiment will be described with reference to FIG. 1. The first exemplary embodiment relates to a method of reducing the processing loads accompanied by the duplication exclusion of the data to be copied. FIG. 1 illustrates an example of a storage control apparatus according to the first exemplary embodiment. It is noted that a storage control apparatus 10 illustrated in FIG. 1 is an example of the storage control apparatus according to the first exemplary embodiment.

As illustrated in FIG. 1, the storage control apparatus 10 includes a memory unit 11 and a control unit 12.

The memory unit 11 is a volatile memory device such as a random access memory (RAM) or a non-volatile memory device such as the HDD or the flash memory. The control unit 12 is a single or a plurality of processors such as a central processing unit (CPU), a digital signal processor (DSP), an application specific integrated circuit (ASIC), and a field programmable gate array (FPGA). The control unit 12 executes programs stored in the memory unit 11 or another memory (not illustrated), for example.

The storage control apparatus 10 is coupled to a physical area 20. The physical area 20 is, for example, a memory area formed by a memory device such as the HDD, the SSD, or the RAID device or a storage pool formed by a plurality of memory areas. For example, at least part of a first logical area 21 and at least part of a second logical area 22 are associated with the physical area 20.

A relationship between addresses (logical addresses) of the first logical area 21 and the second logical area 22 and an address (physical address) of the physical area 20 is defined by meta-information 11a stored in the memory unit 11. The meta-information 11a exemplified in FIG. 1 includes information 31 related to the first logical area 21 and the information 32 related to the second logical area 22.

The information 31 related to the first logical area 21 associates the logical address of the first logical area 21 with the physical address of the physical area 20. The information 32 related to the second logical area 22 associates the logical address of the second logical area 22 with the physical address of the physical area 20.

A block denoted by "#00" in a frame of the first logical area 21 represents data at a logical address "IgAdd #00". On the other hand, a block denoted by "#0" in a frame of the physical area 20 represents data at a physical address "phAdd #0". Herein, "IgAdd #00" and "phAdd #0" are associated with each other in the information 31 related to the first logical area 21. The same also applies to "#01" and "#02". It is noted that, for convenience of the descriptions, data is not stored in the second logical area 22 in a state before the copy is performed.

When the data in the first logical area 21 is copied to the second logical area 22, the control unit 12 associates the address of the physical area 20 corresponding to the address of the data in the first logical area 21 with the copy destination address of the data in the second logical area 22 by using the meta-information 11a and completes the copy.

For example, in a case where the data at IgAdd #00 in the first logical area 21 is respectively copied to IgAdd #10 in the second logical area 22, the control unit 12 obtains phAdd #0 corresponding to IgAdd #00 from the information 31 related to the first logical area 21. Subsequently, the control unit 12 writes "phAdd #0" into a field of the physical address corresponding to IgAdd #10 as the copy destination address among the information 32 related to the second logical area 22. That is, the control unit 12 associates IgAdd #10 with phAdd #0.

The control unit 12 that has associated IgAdd #10 with phAdd #0 updates information of a state corresponding to IgAdd #10 among completion information 11b for managing a state of the copy to "completed". It is noted that the completion information 11b is stored in the memory unit 11. Similarly, the control unit 12 associates IgAdd #11 with phAdd #1 and associates IgAdd #12 with phAdd #2. Subsequently, the control unit 12 updates information of states corresponding to IgAdd #11 and IgAdd #12 to "completed".

As described above, while it is set that the copy is completed upon the update of the meta-information 11a, the same data is not redundantly stored in the physical area 20, and it is possible to efficiently use the physical area 20. In a case where the duplication exclusion is executed after the copy is performed, the data is once written at the copy destination address in the physical area 20, and the processing of deleting the data thereafter occurs. However, the wasteful write processing and the deletion processing can be omitted by the application of the above-mentioned technology according to the first exemplary embodiment. As a result, the processing loads accompanied by the duplication exclusion can be reduced.

The first exemplary embodiment has been described above.

2. Second Exemplary Embodiment

Next, a second exemplary embodiment will be described. The second exemplary embodiment relates to a storage system having a duplication exclusion function.

2-1. System

Figure 2:
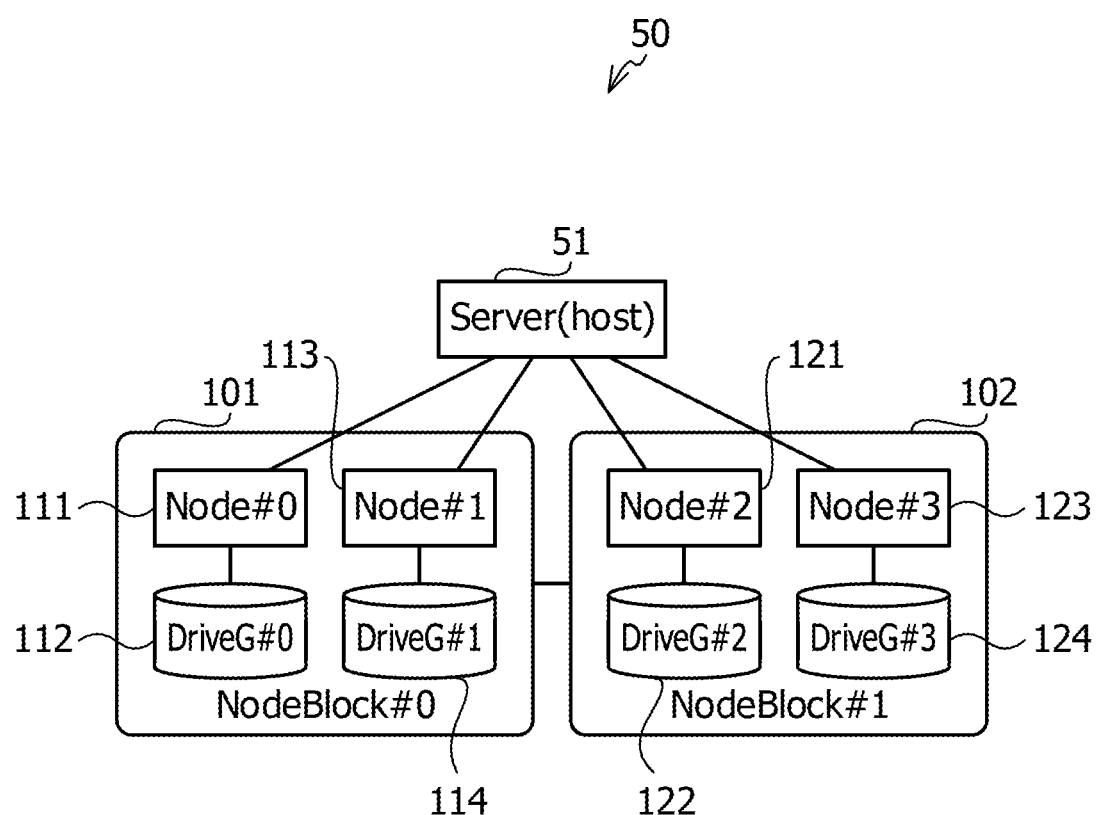
FIG. 2 illustrates an example of a storage system according to a second exemplary embodiment.

A storage system according to the second exemplary embodiment will be described with reference to FIG. 2. FIG. 2 illustrates an example of the storage system according to the second exemplary embodiment. It is noted that a storage system 50 illustrated in FIG. 2 is an example of the storage system according to the second exemplary embodiment.

As illustrated in FIG. 2, the storage system 50 includes a server 51 and node blocks 101 and 102. The server 51 is, for example, a host computer. Each of the node blocks 101 and 102 is, for example, a storage apparatus accommodated in a single casing. Hereinafter, for convenience of the descriptions, the node blocks 101 and 102 are respectively denoted by NodeBlock #0 and NodeBlock #1 in some cases.

The node block 101 includes the nodes 111 and 113 and drive groups 112 and 114. The nodes 111 and 113 are computers that process an I/O request accepted from the server 51. It is noted that the nodes 111 and 113 are examples of the storage control apparatus. The drive groups 112 and 114 are, for example, a set of the memory devices to which the memory device such as the HDD, the SSD, or the RAID device or the plurality of memory devices are coupled.

The node block 102 includes nodes 121 and 123 and drive groups 122 and 124. The nodes 121 and 123 are computer that process an I/O request accepted from the server 51. It is noted that the nodes 121 and 123 are examples of the storage control apparatus. The drive groups 122 and 124 are, for example, a set of the memory devices to which the memory device such as the HDD, the SSD, or the RAID device or the plurality of memory devices are coupled.

Hereinafter, for convenience of the descriptions, the nodes 111, 113, 121, and 123 may be respectively denoted by Node #0, Node #1, Node #2, and Node #3, and the drive groups 112, 114, 122, and 124 may be respectively denoted by DriveG #0, DriveG #1, DriveG #2, and DriveG #3 in some cases.

The server 51 is coupled to the nodes 111, 113, 121, and 123, for example, by using a fibre channel (FC), an internet small computer system interface (iSCSI), or the like. The node blocks 101 and 102 are coupled to each other by using, for example, the FC, the iSCSI, a local area network (LAN), or the like. The nodes 111, 113, 121, and 123 and the drive groups 112, 114, 122, and 124 are respectively coupled to each other by using the FC, the iSCSI, serial advanced technology attachment (SATA), or the like. It is noted that these coupling methods are examples and are not limited to the above-mentioned examples.

Hardware of Server

Figure 3:
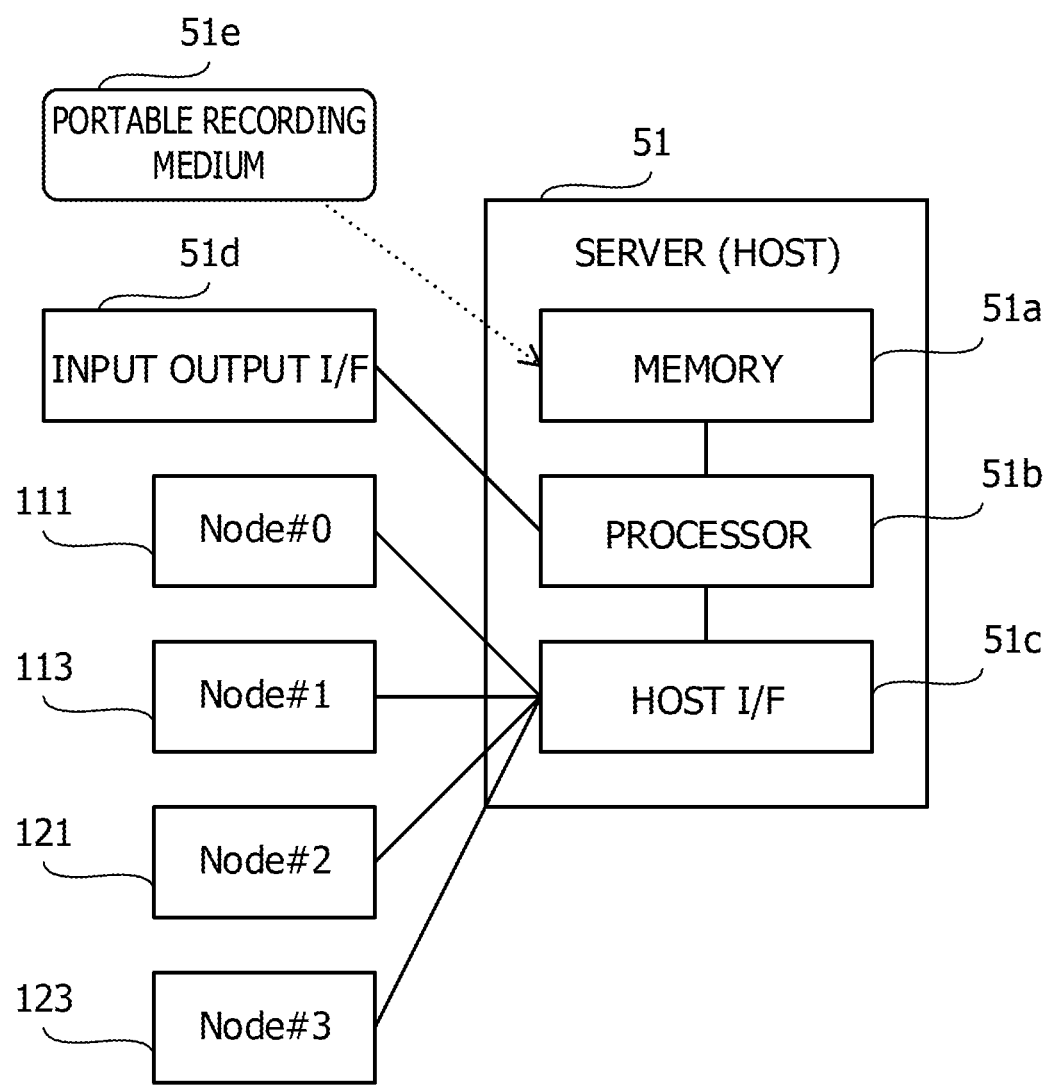
FIG. 3 is a block diagram illustrating an example of hardware that can realize a function of a server according to the second exemplary embodiment.

Hardware of the server 51 will be described with reference to FIG. 3. FIG. 3 is a block diagram illustrating an example of hardware that can realize a function of the server according to the second exemplary embodiment.

As illustrated in FIG. 3, the server 51 includes a memory 51a, a processor 51b, and a host interface (I/F) 51c.

The memory 51a is a volatile memory device such as the RAM or a non-volatile memory device such as the HDD or the flash memory. The processor 51b is a calculation circuit including a single or a plurality of processors such as the CPU, the DSP, the ASIC, and the FPGA. The host I/F 51c is a host bus adapter (HBA) or a communication interface configured to couple the host computer to another device (such as the storage apparatus or a network device).

The processor 51b is coupled to an input and output I/F 51d. The input and output I/F 51d is, for example, an input apparatus such as a keyboard, a mouse, or a touch pad or a display apparatus such as an electro-luminescent display (ELD) or a liquid crystal display (LCD). The processor 51b executes programs stored in the memory 51a, for example.

It is noted that the programs are previously stored in the memory 51a or read out from a portable storage medium 51e such as an optical disk, a magnetic disk, or a semiconductor memory and stored in the memory 51a by the processor 51b. The server 51 is coupled to the nodes 111, 113, 121, and 123 via the host I/F 51c.

Hardware and Software Stack of Node

Figure 4:
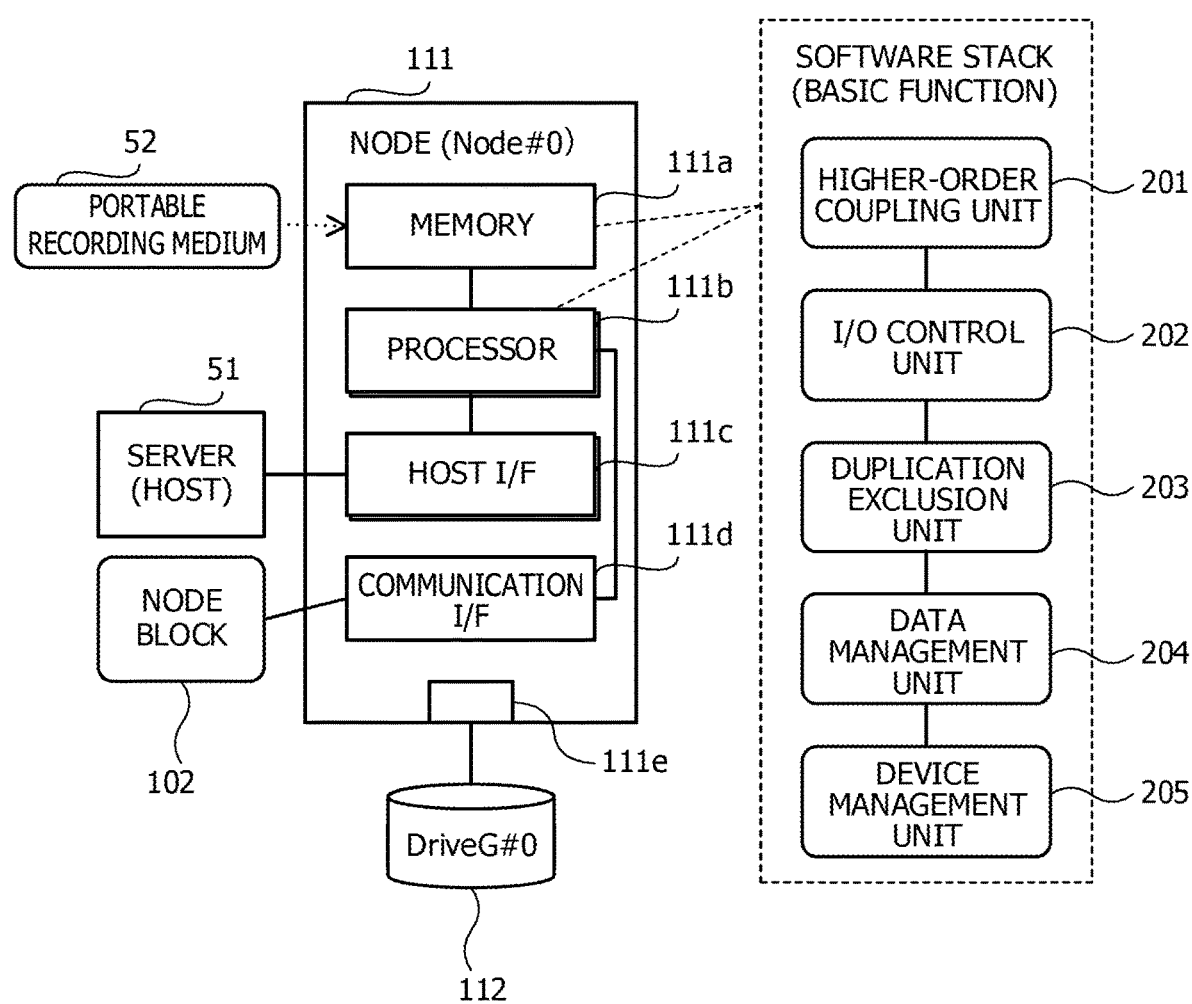
FIG. 4 is a block diagram illustrating examples of hardware and software stack that can realize a function of a node according to the second exemplary embodiment.

Hardware and software stack of the node 111 will be described with reference to FIG. 4. FIG. 4 is a block diagram illustrating examples of the hardware and the software stack that can realize a function of the node according to the second exemplary embodiment. It is noted that, since the hardware and the software stack of the nodes 111, 113, 121, and 123 are substantially the same, descriptions of the nodes 113, 121, and 123 will be omitted.

As illustrated in FIG. 4, the node 111 includes a memory 111a, a processor 111b, a host I/F 111c, a communication I/F 111d, and a coupling I/F 111e.

The memory 111a is a volatile memory device such as the RAM or a non-volatile memory device such as the HDD or the flash memory. The processor 111b is a calculation circuit including a single or a plurality of processors such as the CPU, the DSP, the ASIC, and the FPGA. The host I/F 111c is, for example, the HBA. In the example of FIG. 4, a plurality of processors including the processor 111b and a plurality of host interfaces including the host I/F 111c are mounted to the node 111.

The communication I/F 111d is a communication interface (such as an FC adapter or an iSCSI adapter) used for a communication with the node block 102. The coupling I/F 111e is a coupling interface (such as the FC adapter or an SATA adapter) for coupling to the drive group 112.

The processor 111b executes programs stored in the memory 111a, for example. The programs are previously stored in the memory 111a or read out from a portable storage medium 52 such as an optical disk, a magnetic disk, or a semiconductor memory and stored in the memory 111a by the processor 111b. The server 51 is coupled to the node 111 via the host I/F 111c. The node 111 is coupled to the node block 102 via the communication I/F 111d.

Basic functions provided by the node 111 are mainly realized by software processing by the memory 111a and the processor 111b.

As illustrated in FIG. 4, the node 111 includes a higher-order coupling unit 201, an I/O control unit 202, a duplication exclusion unit 203, a data management unit 204, and a device management unit 205 as function elements. It is noted that a modification can also be made such that dedicated-use hardware is used to realize at least part of the function elements.

The higher-order coupling unit 201 accepts an I/O request from the server 51. The I/O control unit 202 controls I/O processing in accordance with the I/O request accepted by the higher-order coupling unit 201. The duplication exclusion unit 203 determines the presence or absence of the duplicate data. The data management unit 204 executes data compression and decompression, buffering, management of meta-information (information for associating the logical address with the physical address) which will be described below, and the like. The device management unit 205 executes the data read and write processing with respect to the drive group 112.

Data Write Method

Here, a data write method will be described.

Figure 5:
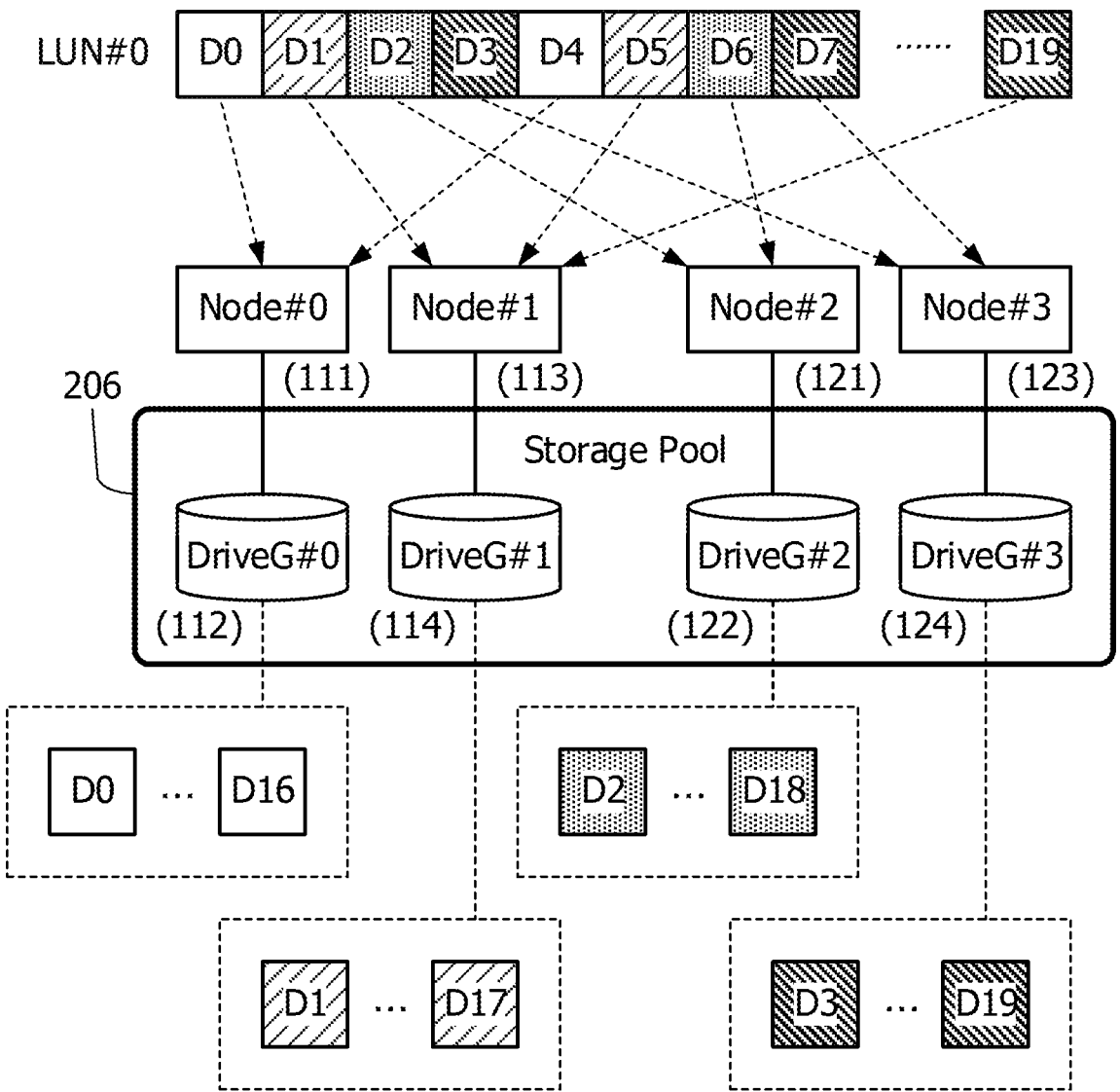
FIG. 5 is an explanatory diagram for describing dispersed arrangement of data with respect to a plurality of nodes.

First, a reference is made to FIG. 5. FIG. 5 is an explanatory diagram for describing dispersed arrangement of data with respect to a plurality of nodes.

The data of the write target (WRITE I/O data) is divided into plural pieces of data (real data) to be dispersedly arranged in the nodes 111, 113, 121, and 123 to realize load dispersion between the nodes in the storage system 50. Subsequently, the plural pieces of real data dispersedly arranged in the nodes 111, 113, 121, and 123 are respectively written into the drive groups 112, 114, 122, and 124.

It is noted that a storage pool 206 where the drive groups 112, 114, 122, and 124 are bundled together is used as the physical area to which the data is to be written into the storage system 50. A position of the data to be written into the storage pool 206 is managed by an address (physical address) of the storage pool 206.

In the example of FIG. 5, the WRITE I/O data in the 0-th logical area (hereinafter, referred to as logical unit number (LUN) #0) is written into the storage pool 206. The WRITE I/O data is divided, for example, into read data D0, D1, . . . , D19. Subsequently, Dk (k=p+4q; p=0, 1, 2, 3, and q=0, 1, 2, 3, 4) is allocated to Node # p. The loads of the nodes 111, 113, 121, and 123 and the drive groups 112, 114, 122, and 124 are dispersed by the application of the dispersed arrangement.

It is noted that rearrangement of the data is executed in a case where the number of nodes is increased.

Figure 6:
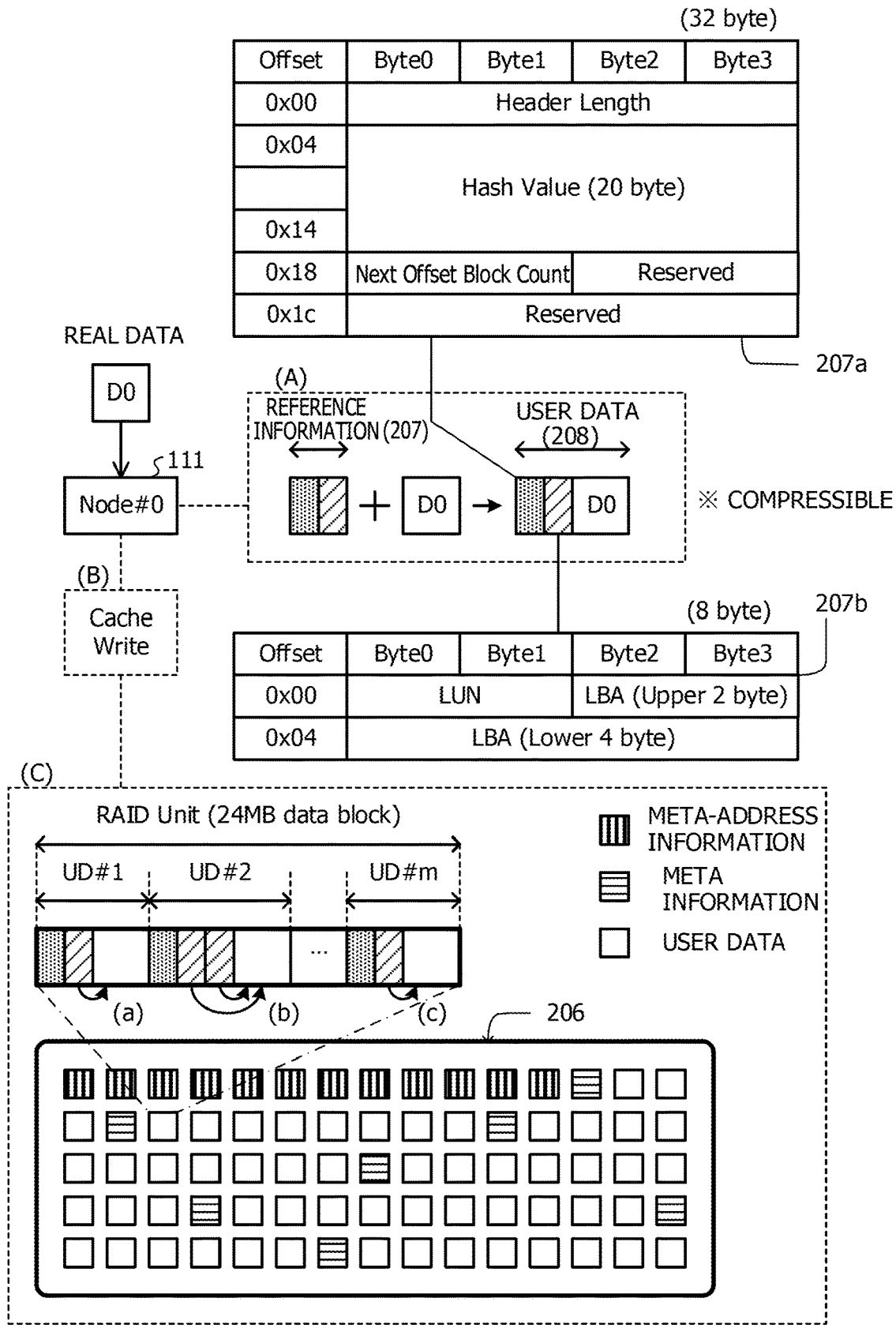
FIG. 6 is an explanatory diagram for describing a management method for user data and meta-information written into a storage pool.

Next, a reference is made to FIG. 6. FIG. 6 is an explanatory diagram for describing a management method for user data and meta-information written into the storage pool.

As represented by (A) in FIG. 6, when the read data D0 is written into the storage pool 206, the data management unit 204 adds reference information 207 to the read data D0 to generate user data 208. The reference information 207 includes a super block (SB) 207a and reference LUN/logical block addressing (LBA) information 207b.

The SB 207a is set as 32 bytes, for example, and includes a header length indicating a length of the reference information 207 (Header Length), a hash value of the read data D0 (Hash Value), and the like. The reference LUN/LBA information 207b is set as 8 bytes, for example, and includes the LUN in the logical area where the read data D0 is stored and the LBA indicating the storage position. That is, the reference LUN/LBA information 207b includes information related to the logical storage destination of the read data D0.

In a case where the read data Dx having the same contents as the read data D0 is to be written, the data management unit 204 generates the reference LUN/LBA information 207b including the LUN of the logical area corresponding to the storage destination of the read data Dx and the LBA indicating the storage position. The data management unit 204 also adds the reference LUN/LBA information 207b of the read data Dx to the user data 208 of the read data D0.

The data management unit 204 temporarily stores the user data 208 in the memory 111a as represented by (B) in FIG. 6. It is noted that the storage destination of the user data 208 may be a cache memory (not illustrated) which is different from the memory 111a. The data management unit 204 executes control for adding plural pieces of user data respectively corresponding to the plural pieces of real data to the memory 111a to be written out into the storage pool 206 while a predetermined amount of data (for example, 24 MB) is set as a unit.

Hereinafter, for convenience of the descriptions, a unit of data to be written out may be referred to as a RAID unit in some cases. In an example of (C) in FIG. 6, data obtained by user data UD #1, UD #2, . . . , UD # m are combined with one another is written into the storage pool 206. It is noted that arrows (a), (b), and (c) in (C) in FIG. 6 indicate correspondence relationships between the reference LUN/LBA information 207b and the real data. Meta-address information 209 and meta information 210 which will be described below are written into the storage pool 206 in addition to the user data 208.

The meta information 210 is information for associating the logical address with the physical address. The meta-address information 209 is location information of the meta information 210 in the storage pool 206. The meta-address information 209 and the meta information 210 are also written into the storage pool 206 in units of the RAID unit. An area into which the meta-address information 209 is to be written is previously secured in a predetermined range from the beginning of the storage pool 206, for example.

On the other hand, the user data 208 and the meta information 210 are sequentially additionally written into the storage pool 206 at a timing when the data corresponds to the unit of the RAID unit gathers. For this reason, as represented by (C) in FIG. 6, the meta-address information 209 is written in a predetermined range of the storage pool 206 (in this example, a predetermined range from the beginning), and the user data 208 and the meta information 210 exist in a mixed manner.

The meta-address information 209 has a structure and contents as illustrated in FIG. 7. FIG. 7 is an explanatory diagram for describing a structure and contents of the meta-address information.

As illustrated in FIG. 7, the meta-address information 209 includes identification information (Disk Pool No.) of the storage pool 206. The meta-address information 209 also includes identification information (RAID Unit No.) for identifying the RAID unit of the corresponding meta information 210. The meta-address information 209 also includes position information (RAID Unit Offset LBA) in the RAID unit where the corresponding meta information 210 exists. It is possible to search for the meta information 210 stored in the storage pool 206 by referring to the meta-address information 209.

The meta information 210 has a structure and contents as illustrated in FIG. 8. FIG. 8 is an explanatory diagram for describing a structure and contents of the meta information.

As illustrated in FIG. 8, the meta information 210 includes logical address information 210a, physical address information 210b, and the like. The logical address information 210a includes the LUN of the logical area where the user data 208 is stored and the LBA indicating the storage position. The physical address information 210*b* also includes the identification information (Disk Pool No.) of the storage pool 206 where the user data 208 is stored, the identification information (RAID Unit No.) of the RAID unit in the storage pool 206, and the position information (RAID Unit LBA) in the RAID unit.

Figure 9:
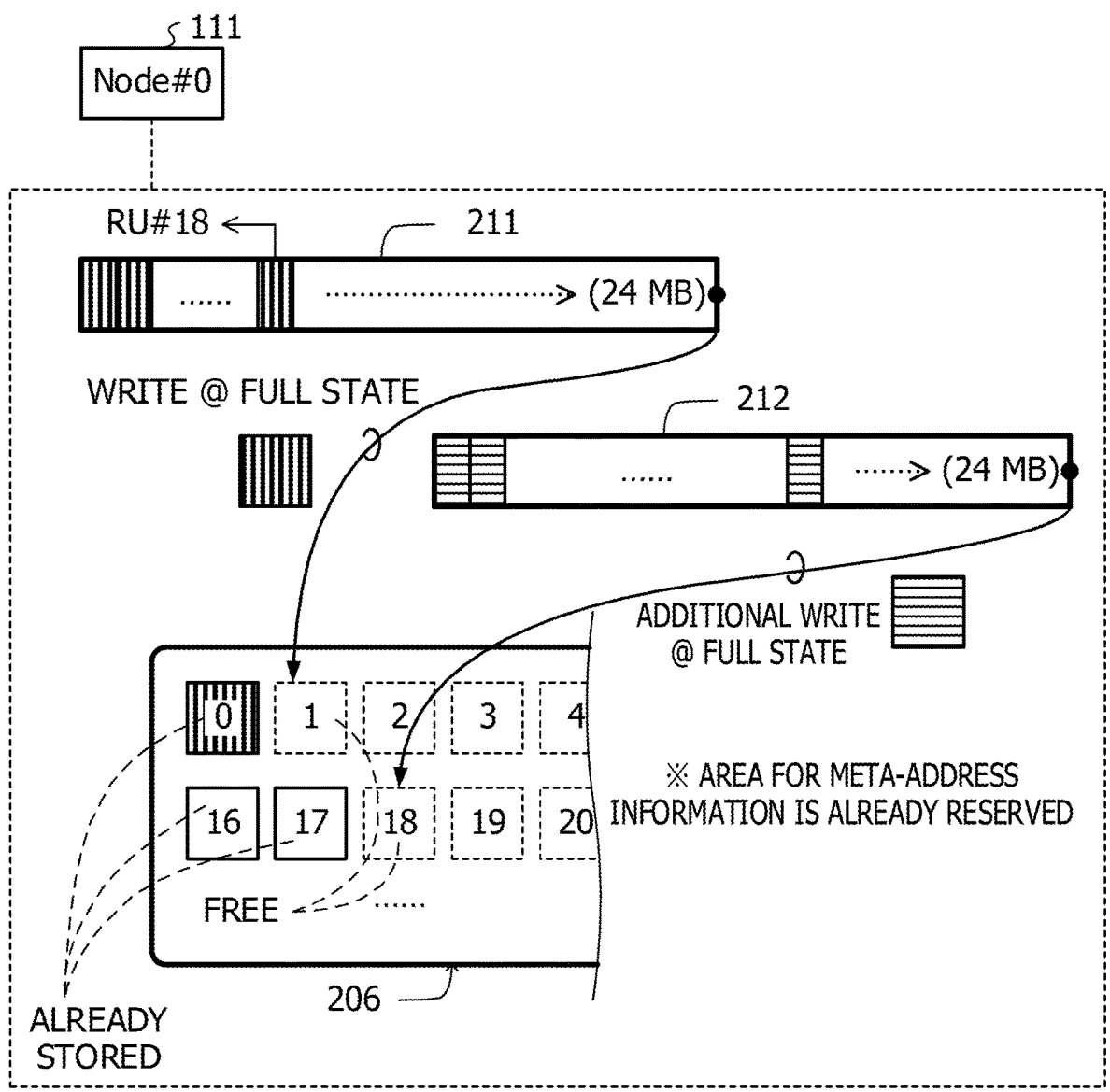
FIG. 9 is an explanatory diagram for describing a method of writing the meta-address information and the meta-information into a cache and the storage pool.

The meta-address information 209 and the meta information 210 are cached into the memory 111*a* by a method as illustrated in FIG. 9 and written into the storage pool 206 in units of the RAID unit. FIG. 9 is an explanatory diagram for describing the method of writing the meta-address information and the meta-information into the cache and the storage pool.

As illustrated in FIG. 9, a meta-address cache 211 where the meta-address information 209 is temporarily stored and a meta-information cache 212 where the meta information 210 is temporarily stored are set the memory 111*a* as cache areas. The meta-address information 209 is accumulated in the meta-address cache 211. The meta information 210 is accumulated in the meta-information cache 212. It is noted that sizes of the meta-address cache 211 and the meta-information cache 212 are set as a size of the RAID unit (for example, 24 MB).

When the data (the meta information 210) of the meta-information cache 212 becomes cache-full (full state), the data is written into the storage pool 206, and the meta-information cache 212 is reset. For example, in a case where the storage of the 17-th RAID unit (RU #17) in the storage pool 206 is already performed, the data of the meta-information cache 212 is written into the 18-th RAID unit (RU #18).

In this case, the meta-address information 209 corresponding to the meta information 210 in RU #18 is generated to be stored in the meta-address cache 211. When the data (the meta-address information 209) of the meta-address cache 211 becomes cache-full (full state), the data is written into the storage pool 206, and the meta-address cache 211 is reset. At this time, the data of the meta-address cache 211 is written into the RAID unit reserved for the meta-address information 209. It is noted that the write of the meta-address information 209 may also be overwriting.

Flow of Write Processing

Figure 10:
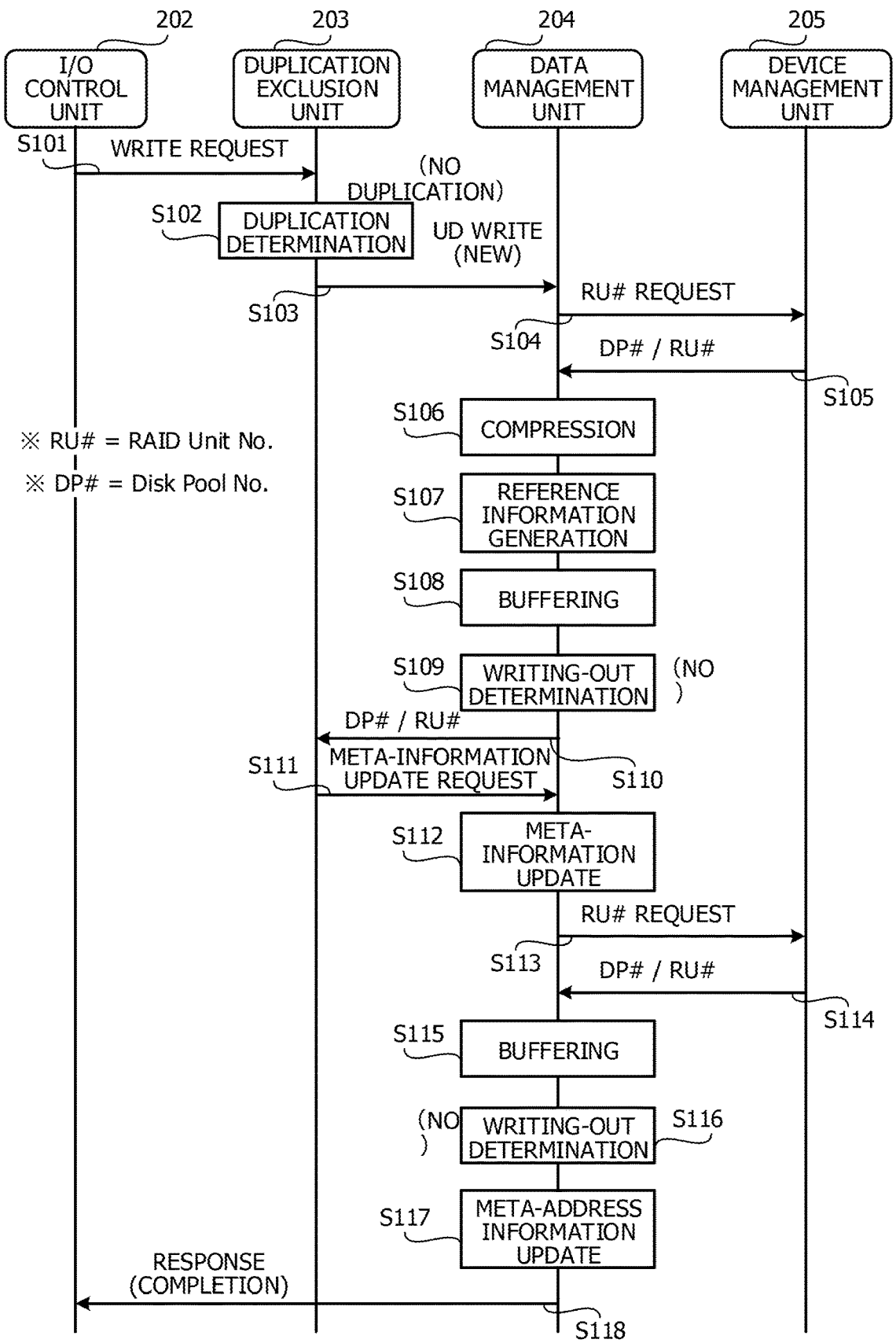
FIG. 10 is a sequence diagram for describing a flow of write processing (in a case where no duplication exists)
Figure 11:
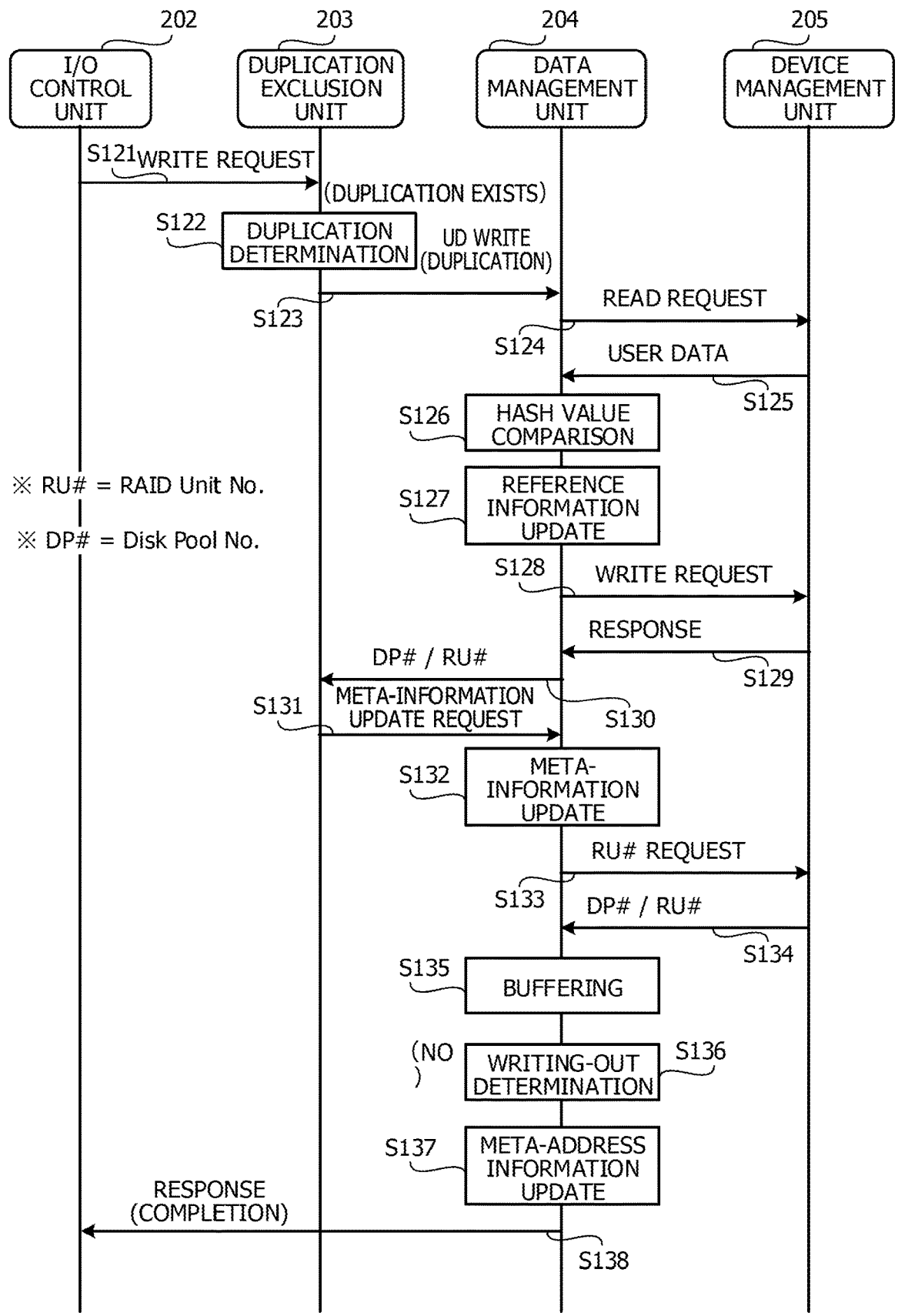
FIG. 11 is a sequence diagram for describing the flow of the write processing (in a case where the duplication exists)

The flow of write processing in the node 111 is as illustrated in FIG. 10 and FIG. 11.

First, a reference is made to FIG. 10. FIG. 10 is a sequence diagram for describing the flow of the write processing (in a case where no duplication exists).

(S101) The I/O control unit 202 accepts a write request of the real data (WRITE request) from the server 51 via the higher-order coupling unit 201 and outputs the WRITE request to the duplication exclusion unit 203 together with the real data.

(S102) The duplication exclusion unit 203 determines whether or not the real data set as the target of the WRITE request becomes the target of the duplication exclusion. For example, the duplication exclusion unit 203 extracts the hash value from the SB 207*a* of the user data 208 in the memory 111*a* or the storage pool 206 to be compared with the hash value of the real data set as the target of the WRITE request. In a case where the hash values are matched with each other, the duplication exclusion unit 203 determines that the duplicate real data exists. In the example of FIG. 10, the duplication exclusion unit 203 determines that no duplication exists.

(S103) The duplication exclusion unit 203 requests the data management unit 204 to newly write the user data 208 (UD WRITE).

(S104) The data management unit 204 requests the device management unit 205 for the identification information (RU #) of the RAID unit set as the write destination of the WRITE request.

(S105) The device management unit 205 outputs the identification information (RU #) of the RAID unit set as the write destination of the WRITE request and the identification information (DP #) of the storage pool 206 where the RAID unit exists to the data management unit 204.

(S106) The data management unit 204 compresses the real data set as the target of the WRITE request. It is noted that a modification may also be made to adopt a setting in which the write into the storage pool 206 is performed in a decompressed state.

(S107, S108) The data management unit 204 generates the reference LUN/LBA information 207*b* by using DP # and RU # output from the device management unit 205 to be combined with the SB 207*a* to generate the reference information 207. Subsequently, the data management unit 204 stores the user data 208 obtained by combining the real data after the compression with the reference information 207 in the memory 111*a* (buffering).

(S109) The data management unit 204 determines whether or not the user data 208 in the memory 111*a* can be written out in units of the RAID unit into the storage pool 206. In a case where the user data 208 can be written out, the writing-out processing into the storage pool 206 is executed. In the example of FIG. 10, the data amount of the user data 208 the memory 111*a* does not each the unit of the RAID unit, and it is determined that the writing-out processing is not to be executed (NO).

(S110, S111) The data management unit 204 outputs DP # and RU # output from the device management unit 205 to the duplication exclusion unit 203. The duplication exclusion unit 203 that has received DP # and RU # recognizes the write destination of the user data 208 and the write completion and requests the data management unit 204 to update the meta information 210.

(S112) The data management unit 204 updates the meta information 210 based on DP # and RU # output from the device management unit 205.

(S113, S114) The data management unit 204 requests the device management unit 205 for the identification information (RU #) of the RAID unit set as the write destination of the meta information 210 corresponding to the buffered user data 208. The device management unit 205 that has received this request outputs the identification information (DP #) and the identification information (RU #) of the RAID unit in the storage pool 206 set as the write destination of the meta information 210 to the data management unit 204.

(S115, S116) The data management unit 204 stores the meta information 210 corresponding to the buffered user data 208 in the meta-information cache 212 (the memory 111*a*) (buffering). Subsequently, the data management unit 204 determines whether or not the meta-information cache 212 is cache-full (writing-out determination). In the case of the cache-full state, the control is executed to write out the data of the meta-information cache 212 into the storage pool 206. In the example of FIG. 10, it is determined that the writing-out processing is not to be performed (NO).

(S117, S118) The data management unit 204 updates the meta-address information 209 by using DP # and RU # received from the device management unit 205. Subsequently, the data management unit 204 notifies the I/O control unit 202 of the write completion of the user data 208 as a response to the WRITE request. The I/O control unit 202 returns a response of the write completion to the server 51 via the higher-order coupling unit 201. When the processing in S118 is completed, the series of processings illustrated in FIG. 10 is ended.

Next, a reference is made to FIG. 11. FIG. 11 is a sequence diagram for describing the flow of the write processing (in a case where the duplication exists).

(S121) The I/O control unit 202 accepts the write request of the real data (WRITE request) from the server 51 via the higher-order coupling unit 201 and outputs the WRITE request to the duplication exclusion unit 203 together with the real data.

(S122) The duplication exclusion unit 203 determines whether or not the real data set as the target of the WRITE request becomes the target of the duplication exclusion. For example, the duplication exclusion unit 203 extracts the hash value from the SB 207a of the user data 208 in the memory 111a or the storage pool 206 to be compared with the hash value of the real data set as the target of the WRITE request. In a case where the hash values are matched with each other, the duplication exclusion unit 203 determines that the duplicate real data exists. In the example of FIG. 11, the duplication exclusion unit 203 determines that the duplication exists.

(S123) The duplication exclusion unit 203 instructs the data management unit 204 to write the duplicate user data 208 (UD WRITE).

(S124) The data management unit 204 requests the device management unit 205 to perform readout processing for reading out the user data 208 including the same data as the real data set as the target of the WRITE request from the storage pool 206 (READ request). It is noted that, in a case where the user data 208 of the readout target exists in the memory 111a, the data management unit 204 may omit the READ request to the device management unit 205 and read out the user data 208 from the memory 111a.

(S125) The device management unit 205 reads out the user data 208 in accordance with the READ request and outputs the read user data 208 to the data management unit 204.

(S126) The data management unit 204 compares the hash value of the SB 207a included in the user data 208 received from the device management unit 205 with the hash value generated from the real data set as the target of the WRITE request. In a case where the hash values are not matched with each other, the data management unit 204 executes error processing. In the example of FIG. 11, the hash values are matched with each other.

(S127) The data management unit 204 generates the reference LUN/LBA information 207b corresponding to the real data set as the target of the WRITE request to be added to the reference information 207 of the user data 208 received from the device management unit 205 (reference information update).

(S128) The data management unit 204 requests the device management unit 205 for the identification information (RU #) of the RAID unit set as the write destination of the WRITE request.

(S129) The device management unit 205 outputs the identification information (RU #) of the RAID unit set as the write destination of the WRITE request and the identification information (DP #) of the storage pool 206 where the RAID unit exists to the data management unit 204.

(S130, S131) The data management unit 204 outputs DP # and RU # output from the device management unit 205 to the duplication exclusion unit 203. The duplication exclusion unit 203 that has received DP # and RU # recognizes the write destination of the user data 208 and the write completion and requests the data management unit 204 to update the meta information 210.

(S132) The data management unit 204 updates the meta information 210 based on DP # and RU # output from the device management unit 205.

(S133, S134) The data management unit 204 requests the device management unit 205 for the identification information (RU #) of the RAID unit set as the write destination of the meta information 210 corresponding to the buffered user data 208. The device management unit 205 that has received this request outputs the identification information (DP #) and the identification information (RU #) of the RAID unit in the storage pool 206 set as the write destination of the meta information 210 to the data management unit 204.

(S135, S136) The data management unit 204 stores the meta information 210 corresponding to the buffered user data 208 in the meta-information cache 212 (the memory 111a) (buffering). Subsequently, the data management unit 204 determines whether or not the meta-information cache 212 is cache-full (writing-out determination). In the case of the cache-full state, the control is executed to write out the data of the meta-information cache 212 into the storage pool 206. In the example of FIG. 11, it is determined that the writing-out processing is not to be performed (NO).

(S137, S138) The data management unit 204 updates the meta-address information 209 by using DP # and RU # received from the device management unit 205. Subsequently, the data management unit 204 notifies the I/O control unit 202 of the write completion of the user data 208 as a response to the WRITE request. The I/O control unit 202 returns a response of the write completion to the server 51 via the higher-order coupling unit 201. When the processing in S138 is completed, the series of processings illustrated in FIG. 11 is ended.

Flow of Read Processing

Figure 12:
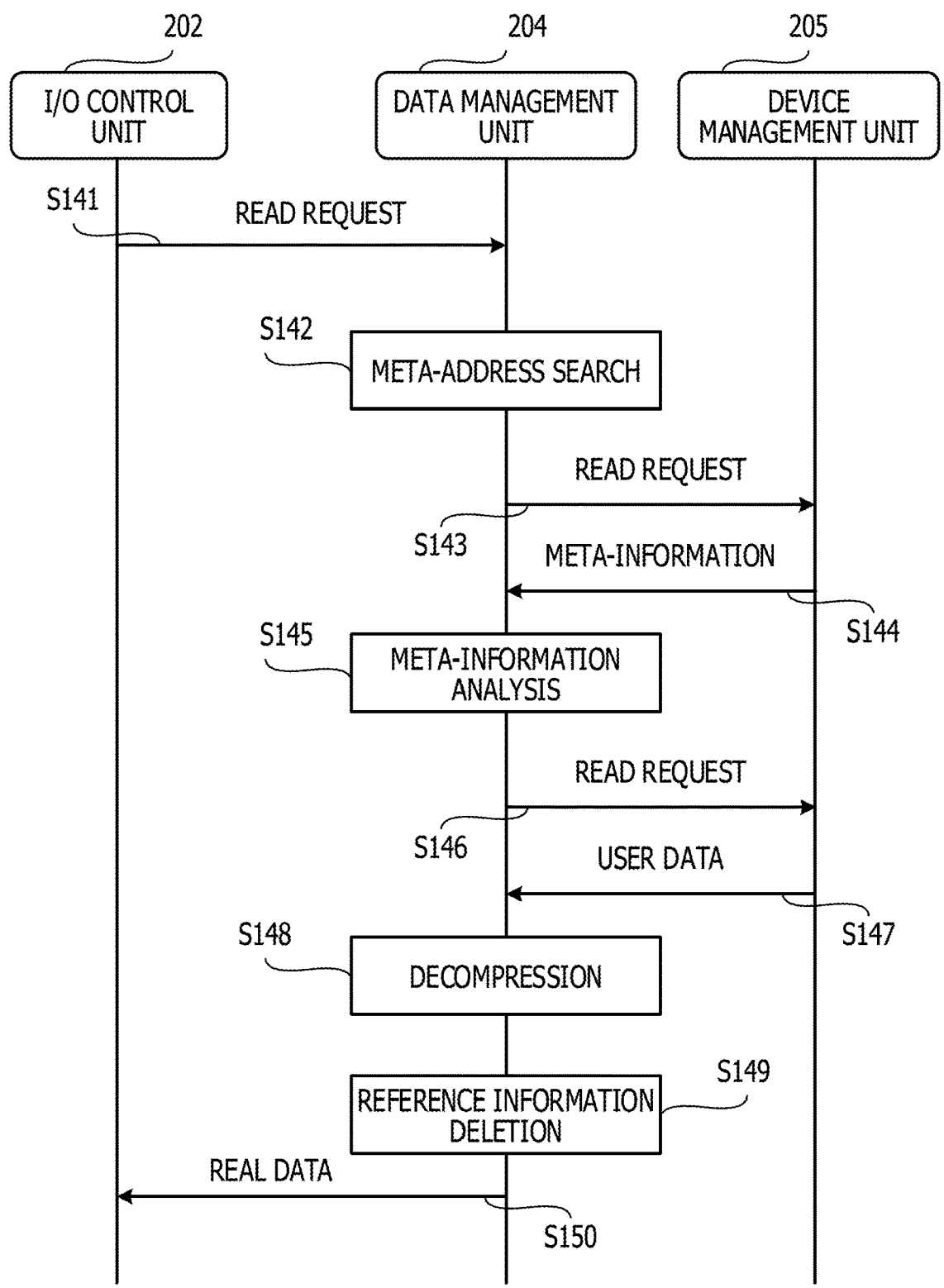
FIG. 12 is a sequence diagram for describing a flow of read processing.

A flow of read processing in the node 111 is as illustrated in FIG. 12. FIG. 12 is a sequence diagram for describing the flow of the read processing.

(S141) The I/O control unit 202 accepts a read request of the real data (READ request) from the server 51 via the higher-order coupling unit 201 and outputs the READ request to the data management unit 204.

(S142, S143) The data management unit 204 searches for the meta-address information 209 including the information such as the storage pool 206 and the RAID unit where the meta information 210 exists. Subsequently, the data management unit 204 notifies the device management unit 205 of the meta-address information 209 to request the readout of the meta information 210 (READ request).

(S144) The device management unit 205 reads out the meta information 210 from the storage pool 206 in accordance with the READ request accepted from the data management unit 204 to be output to the data management unit 204. It is noted that, in a case where the relevant meta information 210 exists in the meta-address cache 211, the device management unit 205 outputs the meta information 210 read out from the meta-address cache 211 to the data management unit 204.

(S145, S146) The data management unit 204 analyzes the meta information 210 and specifies the physical address information 210b including the storage pool 206, the RAID unit, and the physical address where the data set as the target of the READ request which is accepted from the I/O control unit 202 exists, and the like. Subsequently, the data management unit 204 notifies the device management unit 205 of the physical address information 210*b* to request the readout of the user data 208 (READ request).

(S147) The device management unit 205 reads out the user data 208 from the storage pool 206 in accordance with the READ request accepted from the data management unit 204 to be output to the data management unit 204. It is noted that, in a case where the relevant user data 208 is cached into the memory 111*a*, the device management unit 205 outputs the user data 208 read out from the memory 111*a* to the data management unit 204.

(S148, S149) In a case where the user data 208 is compressed, the data management unit 204 decompresses the user data 208. The data management unit 204 also deletes the reference information 207 assigned to the user data 208 to restore the real data.

(S150) The data management unit 204 outputs the restored real data to the I/O control unit 202 as a response to the READ request. The I/O control unit 202 outputs the real data to the server 51 via the higher-order coupling unit 201. When the processing in S150 is completed, the series of processings illustrated in FIG. 12 is ended.

The storage system according to the second exemplary embodiment has been described above. It is noted herein that, for convenience, the descriptions have been provided with regard to the data write and readout operations while the basic function of the node 111 is represented as software stack, and an element of the software stack is set as the unit. The descriptions have also been provided with regard to the scheme where the user data 208 and the meta information 210 are additionally written into the storage pool 206 in units of the RAID unit.

The application of the above-mentioned scheme may be expected to contribute to realization of a system that decreases a write frequency to recording media that form the storage pool 206 and lead to cost reduction, improvement in operation efficiency, and the like when recording media having a restriction on the number of write operations such as the SSD are used. It is noted however that the storage system 50 described above is an example of the system to which the technology according to the second exemplary embodiment can be applied, and modifications for omitting part of the functions and adding other functions can also be made.

2-2. Duplication Exclusion Copy

The duplication exclusion function for suppressing the write of the same data into the storage pool 206 is mounted to the storage system 50 described above. In the above-mentioned example, the duplication exclusion is executed at a timing when the write request of the data is accepted. Hereinafter, a method of efficiently executing the duplication exclusion (duplication exclusion copy) during data copy processing will be described.

Snapshot System Duplication Exclusion Copy

Figure 13:
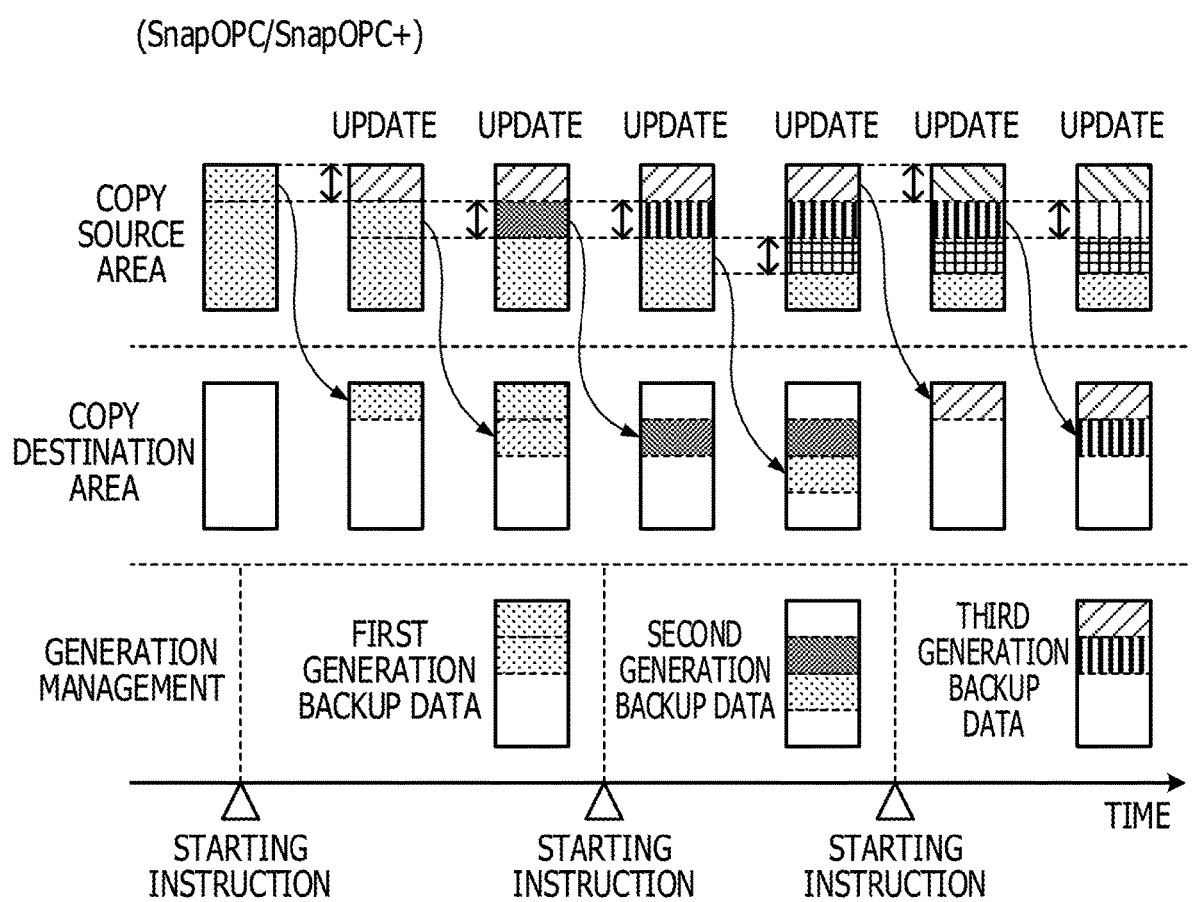
FIG. 13 is an explanatory diagram for describing an example of snapshot system copy (SnapOPC/SnapOPC+)

The duplication exclusion copy can be applied, for example, to copy processing based on a snapshot system (snapshot system copy) for copying an updated part of data in a copy source area to a copy destination area while the time point of a starting instruction is set as a reference. The snapshot system copy includes, for example, a scheme illustrated in FIG. 13. FIG. 13 is an explanatory diagram for describing an example of snapshot system copy (SnapOPC/SnapOPC+).

A horizontal axis of FIG. 13 represents a time axis. The respective blocks aligned next to the description "copy source area" represent the copy source areas at time points corresponding to the respective blocks and data in the copy source areas. The respective blocks aligned next to the description "copy destination area" represent the copy destination areas at the time points corresponding to the respective blocks and data in the copy destination areas. The respective blocks aligned next to the description "generation management" represent states (contents of backup data of the respective generations) of the copy destination areas at the time points corresponding to the respective blocks. It is noted that the generation management is a function of the SnapOPC+.

As illustrated in FIG. 13, when the starting instruction of the snapshot system copy is issued, the data before the update is sequentially copied to the copy destination area in accordance with the data update in the copy source area. When the new starting instruction is issued, the data in the copy destination area copied in accordance with the previous starting instruction is backed up as first generation backup data. Subsequently, in accordance with the data update in the copy source area after the new starting instruction, the data before the update is sequentially copied to the copy destination area. In the example of FIG. 13, second generation backup data, and third generation backup data are generated in addition to the first generation backup data by these procedures.

Figure 14:
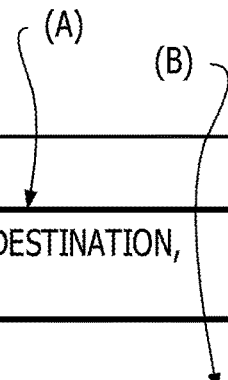
FIG. 14 is an explanatory diagram for describing I/O processing during the snapshot system copy.

The snapshot system copy is executed without interrupting the I/O request by the server 51. For this reason, I/O may occur during the data copy from the copy source area to the copy destination area. In this case, I/O processing during the snapshot system copy is as illustrated, for example, in FIG. 14. FIG. 14 is an explanatory diagram for describing the I/O processing during the snapshot system copy.

In a case where the data write request with respect to the copy source area (copy source WRITE) is issued during the snapshot system copy and the copy is uncompleted, as represented by (A), first, processing for copying the data before the update (old data) to the copy destination area is executed. Subsequently, the write processing with respect to the copy source area in accordance with the copy source WRITE is executed. On the other hand, in a case where the copy is completed, the write processing is executed in accordance with the copy source WRITE.

In a case where the data write request with respect to the copy destination area (copy destination WRITE) is issued during the snapshot system copy and the copy is uncompleted, as represented by (B), first, processing for copying the old data from the copy source area to the copy destination area is executed. Subsequently, the write processing with respect to the copy destination area in accordance with the copy destination WRITE is executed. On the other hand, in a case where the copy is completed, the write processing is executed in accordance with the copy destination WRITE.

In a case where the data readout request with respect to the copy source area (copy source READ) is issued during the snapshot system copy, the readout processing with respect to the copy source area is executed irrespective of a state in which the copy is uncompleted or completed.

In a case where the data readout request with respect to the copy destination area (copy destination READ) is issued during the snapshot system copy and the copy is uncompleted, the readout target data in the copy source area is read out to be output to the server 51 as a response to the copy destination READ. That is, the copy destination READ is internally converted into the data readout request with respect to the copy source area (copy source READ). On the other hand, in a case where the copy is completed, the data readout processing with respect to the data in the copy destination area is executed in accordance with the copy destination READ.

In the cases of (A) and (B), when the write request is issued at a timing when the copy is uncompleted during the snapshot system copy, the write processing for the new data waits until the copy of the target data is completed. In view of the above, the node 111 according to the second exemplary embodiment executes the duplication exclusion copy by the functions of the duplication exclusion unit 203 and the data management unit 204 based on a method illustrated in FIG. 15 and FIG. 16.

Figure 15:
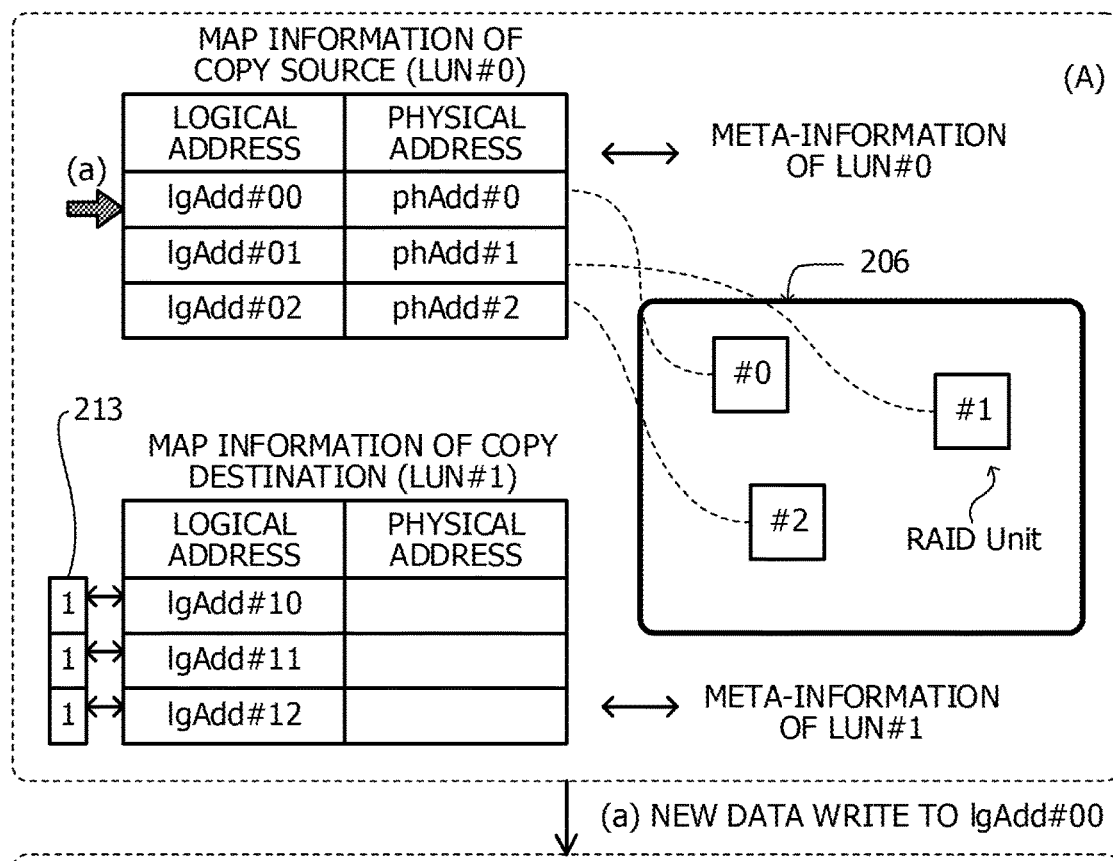
FIG. 15 is an explanatory diagram for describing the I/O processing during snapshot system duplication exclusion copy according to the second exemplary embodiment (in the case of copy source WRITE)
Figure 15:
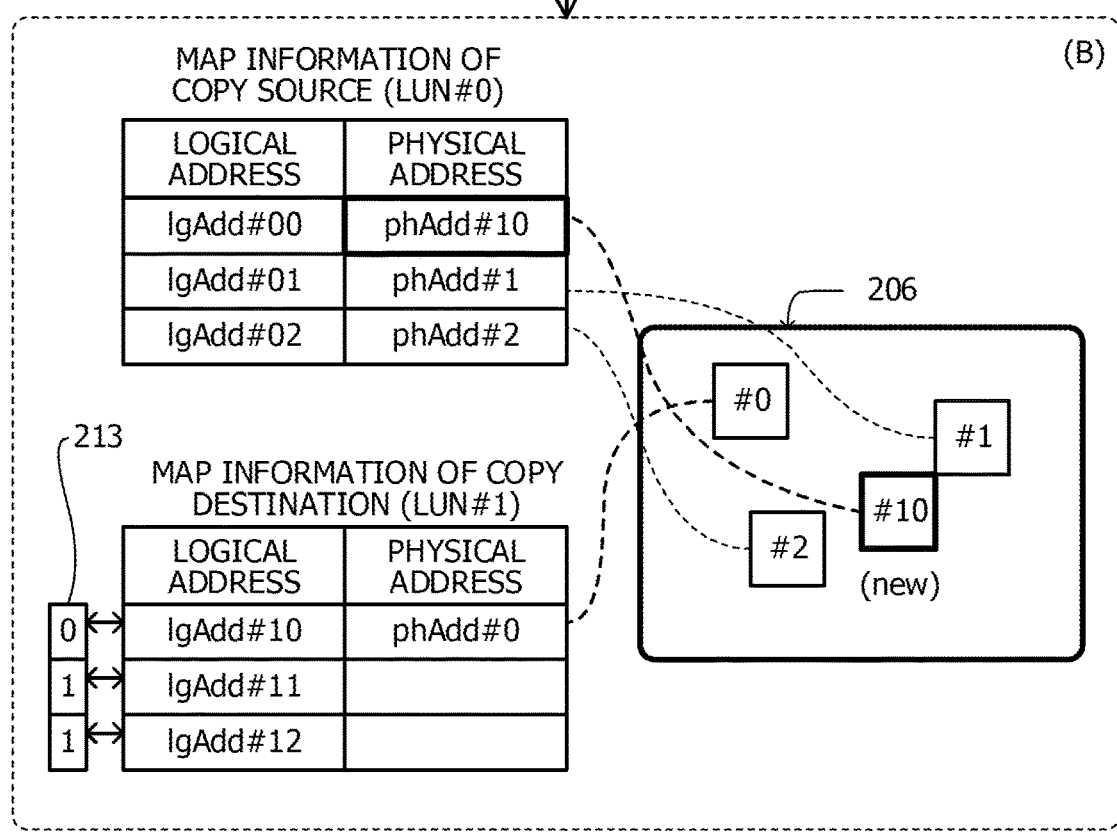

A reference is made to FIG. 15. FIG. 15 is an explanatory diagram for describing the I/O processing during the snapshot system duplication exclusion copy according to the second exemplary embodiment (in the case of copy source WRITE).

A case will be described as an example where the data is copied from LUN #0 to LUN #1 by the snapshot system copy while the 0-th logical area (LUN #0) is set as the copy source area and the first logical area (LUN #1) is set as the copy destination area.

FIG. 15 illustrates map information of LUN #0 and the map information of LUN #1 as information where the logical address and the physical address are associated with each other. It is noted herein that a term "address" is used for convenience of the descriptions. However, the address is not limited to the term representing the address value such as the LBA herein, and the address refers to information representing a position where the data or a set of data (for example, the RAID unit) exists.

In addition, for convenience of the descriptions, the map information in which the representation is simplified is used as an example to provide the descriptions, and the meta information 210 including the logical address information 210a and the physical address information 210b corresponds to the map information. For example, the map information of LUN #0 corresponds to the meta information 210 having the logical address information 210a of LUN #0. The map information of LUN #1 corresponds to the meta information 210 having the logical address information 210a of LUN #1.

(A) in FIG. 15 indicates a state before the copy. The logical addresses IgAdd #00, #01, and #02 of LUN #0 corresponding to the copy source area are respectively associated with the physical addresses phAdd #0, #1, and #2 of the storage pool 206. On the other hand, the correspondence relationships between the logical addresses IgAdd #10, #11, and #12 of LUN #1 corresponding to the copy destination area and the physical addresses of the storage pool 206 are initialized.

In the example of (A) in FIG. 15, the field of the physical address in the map information is left blank to indicate a state in which the corresponding relationship between the logical address and the physical address does not exist (initialized state). It is noted however that, since the copy state (uncompleted/completed) is managed by using a copy bitmap 213, the physical address indicating the previous correspondence relationship may also be described in the field of the physical address. It is noted that the copy bitmap 213 is stored in the memory 111a.

For example, when it is represented that the copy is completed in a case where the value of the copy bitmap 213 is "0" and the copy is uncompleted in a case where the value of the copy bitmap 213 is "1", the copy bitmap 213 corresponding to each logical address of the copy destination area is set as "1" in accordance with the starting instruction of the snapshot system copy.

In the case of the regular snapshot system copy exemplified in FIG. 13, when the data is written at the physical address corresponding to the logical address of the copy destination, the value of the copy bitmap 213 corresponding to the logical address is rewritten from "1" to "0". In addition, as represented by (A) and (B) in FIG. 14, when the write request is issued in a state in which the copy is uncompleted, the processing in accordance with the write request is executed after the write of the data with respect to the higher-order physical address is completed.

On the other hand, in the example of FIG. 15, when the write request of new data (new data WRITE) at the logical address IgAdd #00 is issued in a state in which the copy is uncompleted as represented by (A), the map information of LUN #1 and the copy bitmap 213 are updated as represented by (a) and (B).

For example, the duplication exclusion unit 203 reads out the physical address phAdd #0 corresponding to the logical address IgAdd #00 set as the copy source from the map information of LUN #0. The duplication exclusion unit 203 also associates the read physical address phAdd #0 with the logical address of the copy destination IgAdd #10 in the map information of LUN #1. Subsequently, the duplication exclusion unit 203 rewrites the value of the copy bitmap 213 corresponding to the logical address IgAdd #10 to "0".

Thereafter, the data management unit 204 executes the new data WRITE processing with respect to LUN #0. The data management unit 204 associates the physical address phAdd #10 of the new data written by the new data WRITE with the logical address IgAdd #00 in the map information of LUN #0. That is, the data management unit 204 rewrites the physical address phAdd #0 to phAdd #10. The data management unit 204 also writes the new data into the storage pool 206 via the device management unit 205.

As described above, when the physical address is copied from the map information of LUN #0 to the map information of LUN #1, the configuration is made in which the data existing at the single physical address is referred to from the plurality of logical addresses, and the state of the duplication exclusion is realized. In addition, since the copy is completed by only the update of the map information, it is possible to shorten the time used for the copy processing. Even when the write request with respect to the area where the copy is uncompleted is issued, it is possible to promptly execute the processing in accordance with the write request.

Figure 16:
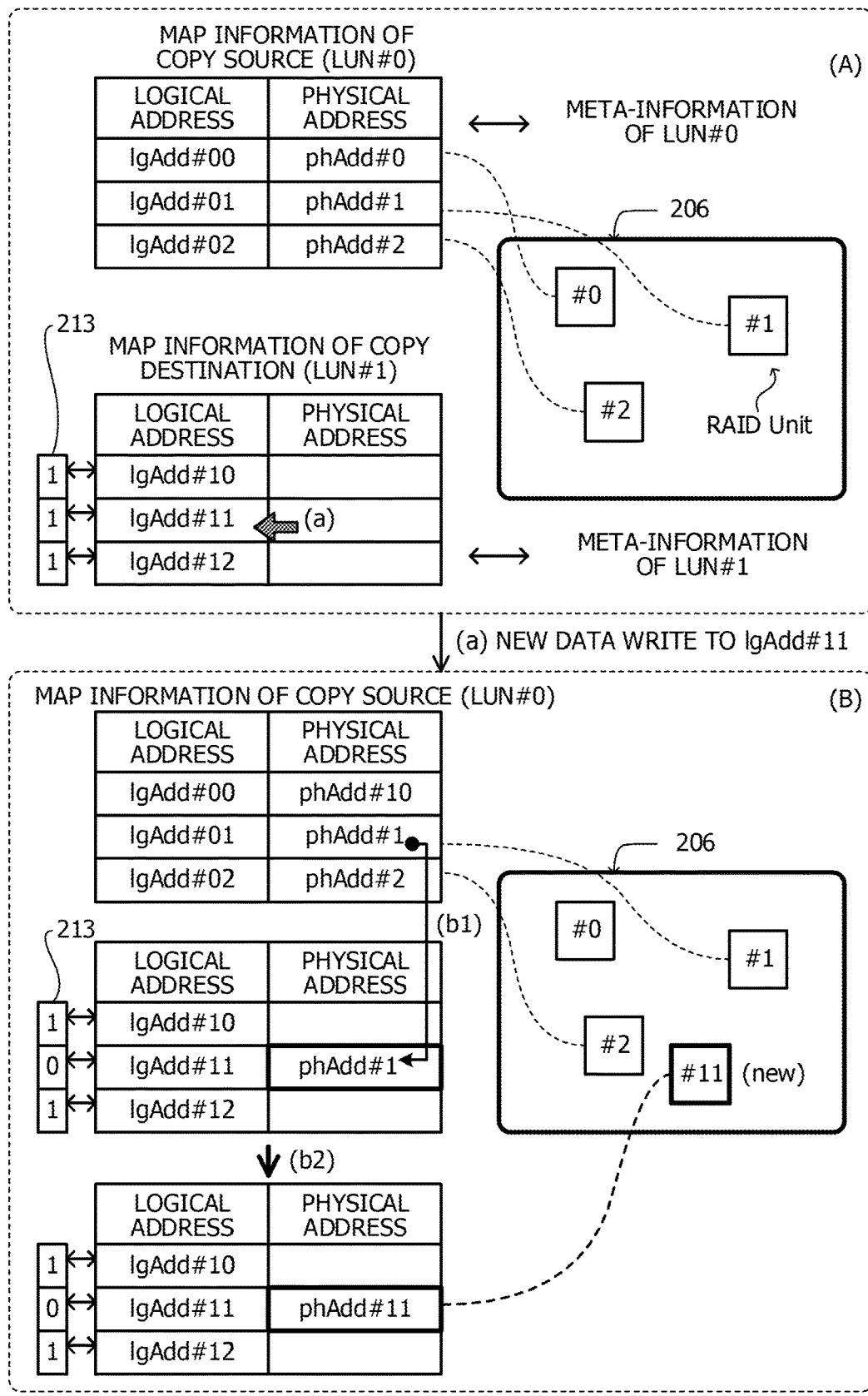
FIG. 16 is an explanatory diagram for describing the I/O processing during the snapshot system duplication exclusion copy according to the second exemplary embodiment (in the case of copy destination WRITE)

A reference is made to FIG. 16. FIG. 16 is an explanatory diagram for describing the I/O processing in the snapshot system duplication exclusion copy according to the second exemplary embodiment (in the case of copy destination WRITE).

As represented by (A) in FIG. 16, in a case where the write request is issued with respect to the logical address IgAdd #11 of LUN #1 corresponding to the copy destination area in a state in which the copy from LUN #0 to LUN #1 is uncompleted, the map information is updated by a method represented by (B) in FIG. 16. First, the physical address phAdd #1 in the map information of LUN #0 is copied to the map information of LUN #1 by the duplication exclusion unit 203, and the value of the corresponding copy bitmap 213 is rewritten to "0" as represented by (b1) in FIG. 16.

Thereafter, the data management unit 204 executes the processing of the new data WRITE with respect to LUN #1. The data management unit 204 associates the physical address phAdd #11 of the new data written by the new data WRITE with the logical address IgAdd #11 in the map information of LUN #1. That is, the data management unit 204 rewrites the physical address phAdd #1 to phAdd #11.

The data management unit 204 also writes the new data into the storage pool 206 via the device management unit 205.

For example, the processing in accordance with the write request includes not only processing for rewriting all the data at the relevant physical address but also processing for rewriting part of the data (update processing) and the like. In the case of the update processing, a reference may be made to the original data in some cases. For this reason, as represented by (B) in FIG. 16, after the physical address is once copied from the map information of LUN #0 to the map information of LUN #1, the processing in accordance with the write request is executed.

As described above, when the physical address is copied from the map information of LUN #0 to the map information of LUN #1, the configuration is made in which the data existing at the single physical address is referred to from the plurality of logical addresses, and the state of the duplication exclusion is realized. In addition, since the copy is completed by only the update of the map information, it is possible to shorten the time used for the copy processing. Even when the write request with respect to the area where the copy is uncompleted is issued, it is possible to promptly execute the processing in accordance with the write request.

Backup System Duplication Exclusion Copy

Figure 17:
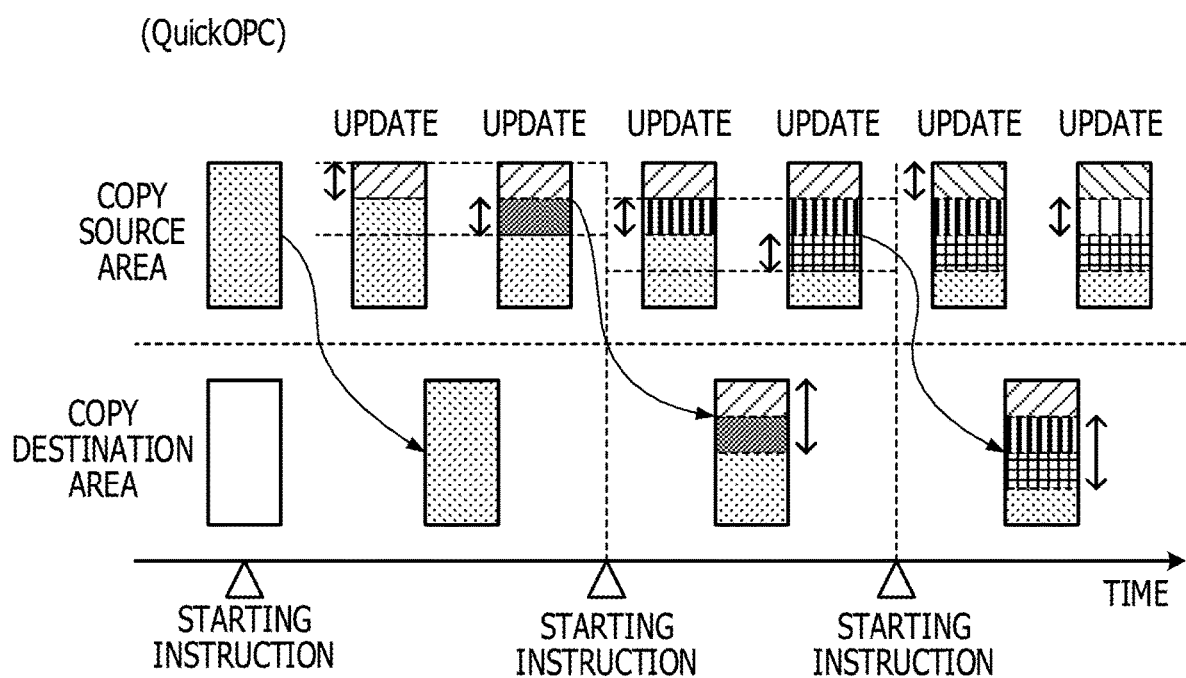
FIG. 17 is an explanatory diagram for describing an example of backup system copy (QuickOPC)

The above-mentioned scheme of the duplication exclusion copy can be applied to not only the snapshot system copy but also backup system copy. The backup system copy includes a scheme illustrated in FIG. 17, for example. FIG. 17 is an explanatory diagram for describing an example of backup system copy (QuickOPC).

A horizontal axis of FIG. 17 represents a time axis. The respective blocks aligned next to the description "copy source area" represent the copy source areas at time points corresponding to the respective blocks and data in the copy source areas. The respective blocks aligned next to the description "copy destination area" represent the copy destination areas at the time points corresponding to the respective blocks and data in the copy destination areas.

As illustrated in FIG. 17, when a starting instruction of the backup system copy is issued, the data in the copy source area at the time point of the starting instruction is copied to the copy destination area. Even when the data in the copy source area is updated after the starting instruction, the update contents do not reflect the copy destination area until the next starting instruction is issued. When the new starting instruction is issued, a difference between the copy source area at the time of the starting instruction and the copy source area at the time point of the previous starting instruction reflects the copy destination area.

The above-mentioned processings are sequentially executed in accordance with the starting instruction of the backup system copy. It is noted that a method of copying all the data in the copy source area at the time point of the starting instruction to the copy destination area is also adopted in addition to the method of copying only the contents (difference) updated between the starting instructions to the copy destination area. Even in a case where either method is adopted, I/O may occur during the data copy from the copy source area to the copy destination area. That is, there is room for improvement similarly as in the snapshot system copy.

Figure 18:
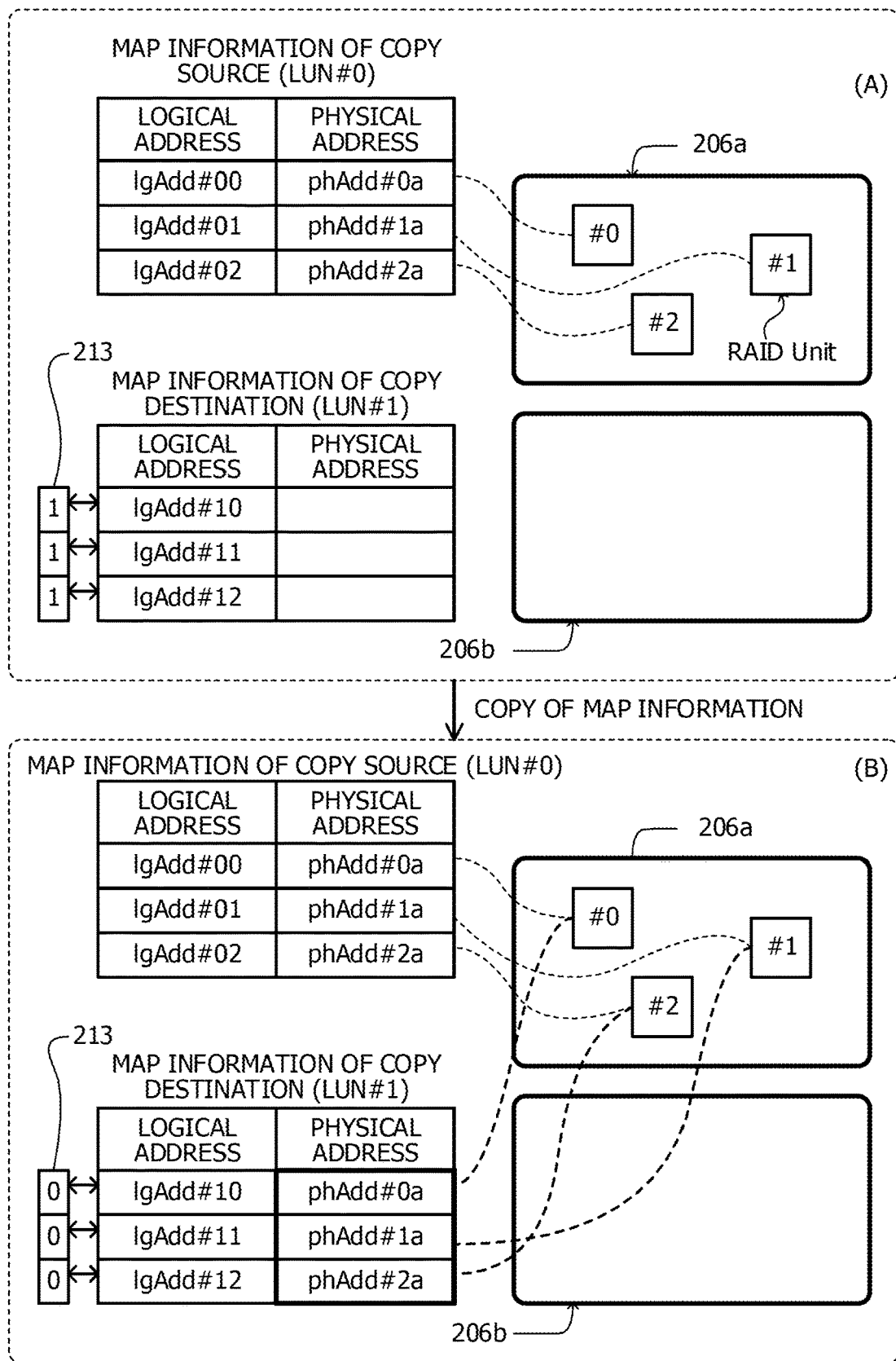
FIG. 18 is an explanatory diagram for describing the I/O processing (initial copy #1) during backup system duplication exclusion copy according to the second exemplary embodiment.

In the case of the backup system copy, the data copy is executed between different storage pools in many cases. FIG. 18 illustrates an example in which data is copied from a business pool 206a used for business processing to a backup pool 206b used for backup of the business pool 206a. FIG. 18 is an explanatory diagram for describing the I/O processing during backup system duplication exclusion copy according to the second exemplary embodiment (initial copy #1).

As represented by (A) in FIG. 18, the RAID units #0, #1, and #2 are respectively stored in the physical addresses phAdd #0a, #1a, and #2a of the business pool 206a. In a case where these RAID units #0, #1, and #2 are copied to the backup pool 206b, as represented by (B) in FIG. 18, the duplication exclusion unit 203 copies the physical addresses phAdd #0a, #1a, and #2a in the map information of LUN #0 to the map information of LUN #1.

The duplication exclusion unit 203 also rewrites the values of the copy bitmaps 213 corresponding to the logical addresses lgAdd #10, #11, and #12 of the copy destinations to "0". The backup system copy is completed by these processings. In this state, a state after the duplication exclusion is realized.

Figure 19:
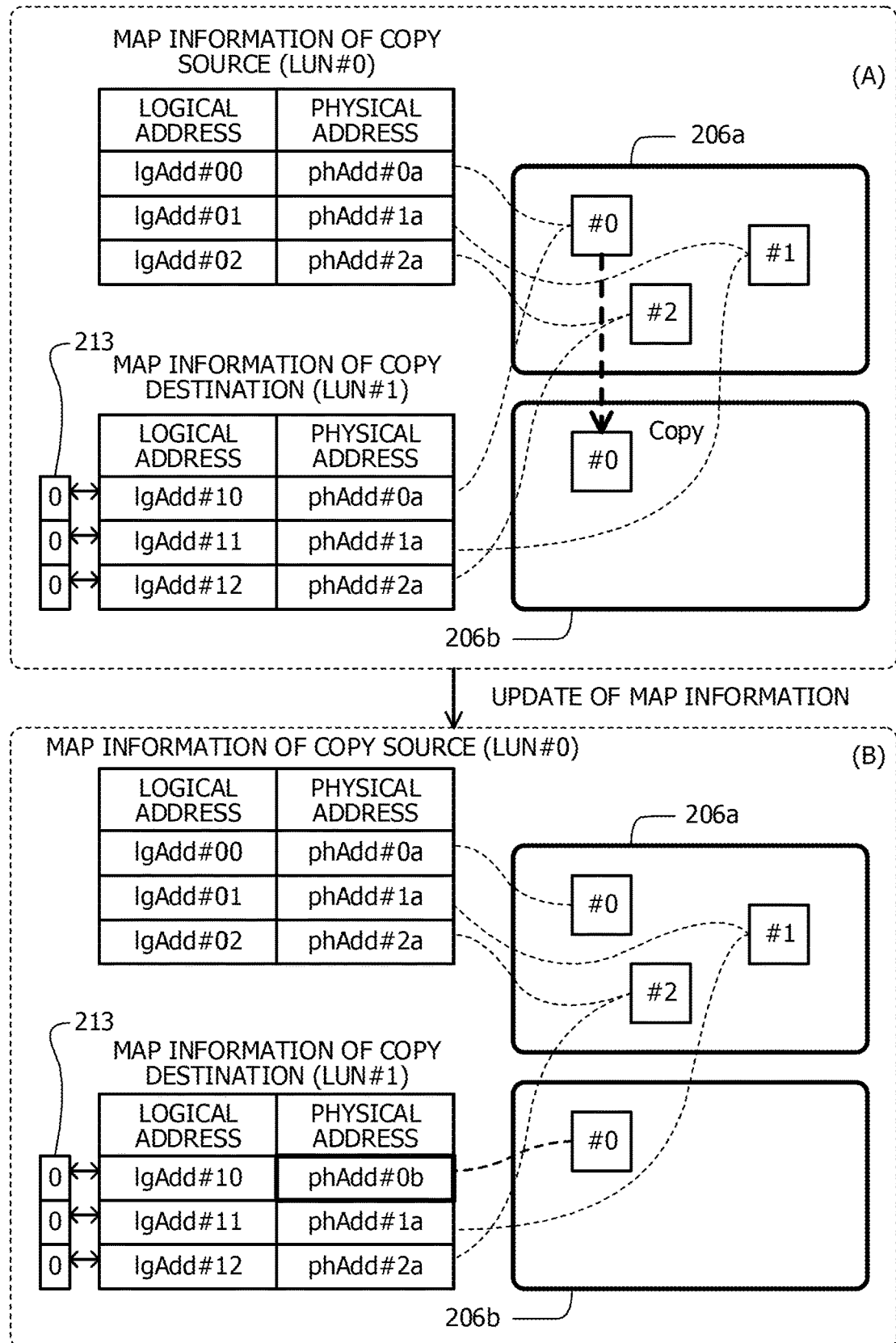
FIG. 19 is an explanatory diagram for describing the I/O processing (initial copy #2) during the backup system duplication exclusion copy according to the second exemplary embodiment.

Thereafter, the data management unit 204 copies the data from the business pool 206a to the backup pool 206b as represented by (A) in FIG. 19. FIG. 19 is an explanatory diagram for describing is an explanatory diagram for describing the I/O processing during backup system duplication exclusion copy according to the second exemplary embodiment (initial copy #2). The data management unit 204 reflects the physical address phAdd #0b of the copy destination (physical address of the backup pool 206b) on the map information of LUN #1.

A timing when the data is copied from the business pool 206a to the backup pool 206b may be set in accordance with loads of the node 111 and access states to the business pool 206a and the backup pool 206b, for example. This timing can also be set by a user or an administrator.

As described above, when the physical address is copied from the map information of LUN #0 to the map information of LUN #1, the configuration is made in which the data existing at the single physical address is referred to from the plurality of logical addresses, and the state of the duplication exclusion is realized. In addition, since the copy is completed by only the update of the map information, it is possible to shorten the time used for the copy processing.

In addition, the timing for copying the physical address between the map information and the timing for actually copying the data from the business pool 206a to the backup pool 206b can be set to be asynchronous to each other. For this reason, while the backup system copy is executed, the data can be saved into the backup pool 206b by getting around a time band when access loads onto the business pool 206a are high.

In addition, when the saving into the backup pool 206b is completed, backup to a portable recording medium such as a magnetic tape can be made, which hardly affects the situation of the business processing. That is, the application of the above-mentioned scheme to the backup system copy contributes to the improvement in performance of the storage system 50 as a whole and the improvement in usability.

Processing Flow: Initial Copy

Figure 20:
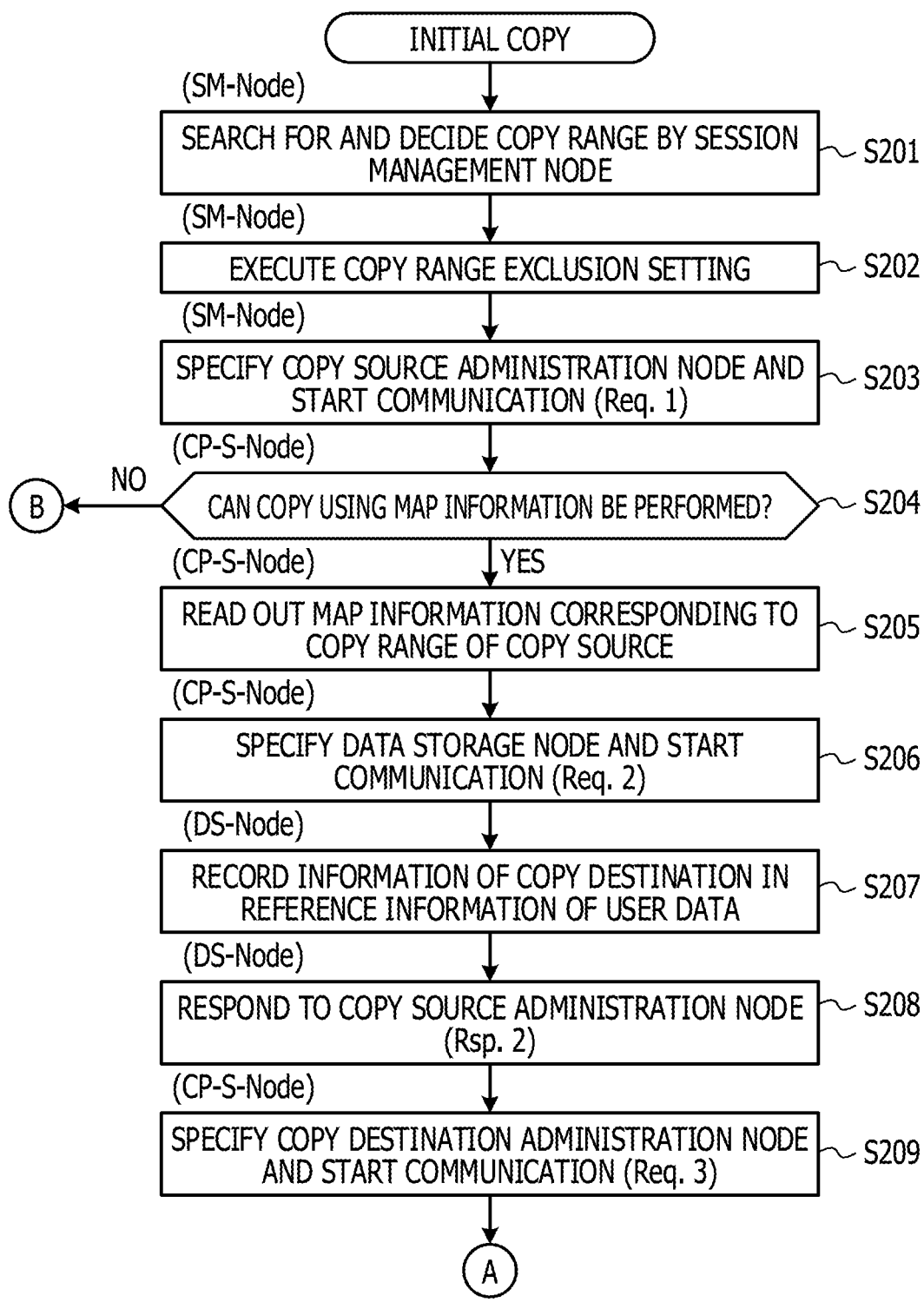
FIG. 20 is a first flow chart illustrating a flow of the I/O processing (initial copy) during duplication exclusion copy according to the second exemplary embodiment.
Figure 21:
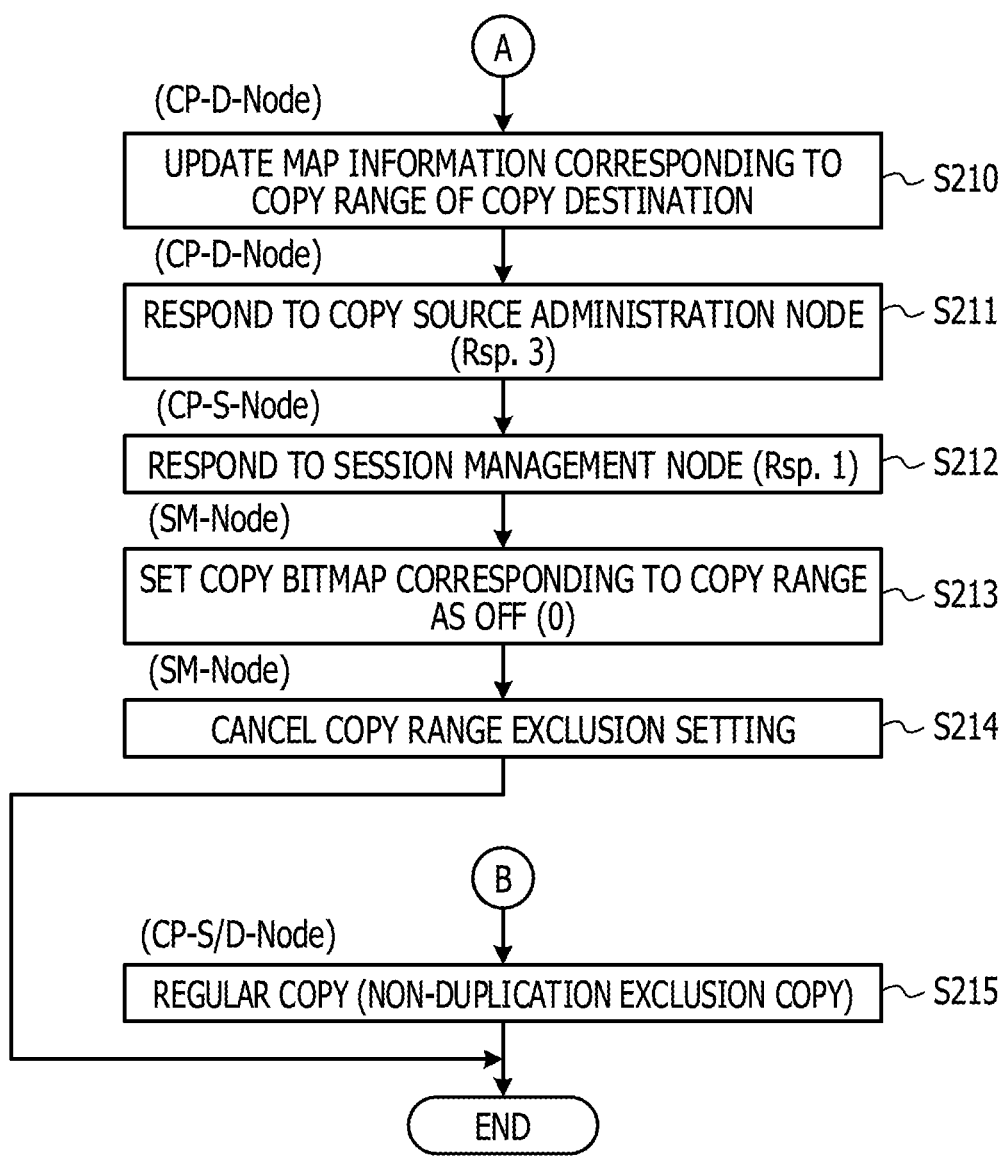
FIG. 21 is a second flow chart illustrating the flow of the I/O processing (initial copy) during the duplication exclusion copy according to the second exemplary embodiment.

Here, a flow of the I/O processing during the duplication exclusion copy will be described with reference to FIG. 20 and FIG. 21. FIG. 20 is a first flow chart illustrating a flow of the I/O processing (initial copy) during duplication exclusion copy according to the second exemplary embodiment. FIG. 21 is a second flow chart illustrating the flow of the I/O processing (initial copy) during the duplication exclusion copy according to the second exemplary embodiment.

The functions of the node 111 have been mainly described so far, but the respective nodes 111, 113, 121, and 123 play predetermined roles in accordance with situations.

For example, the nodes include a session management node that administrates session management, a copy source administration node set as the copy source, a copy destination administration node set as the copy destination, and a data storage node where data is stored in a disk group managed by itself. It is noted that the session management node may be referred to as SM-Node, the copy source administration node may be referred to as CP-S-Node, the copy destination administration node may be referred to as CP-D-Node, and the data storage node may be referred to as DS-Node in some cases.

The session management node is a node that manages the copy bitmap 213 of a copy session. A role of the session management node is allocated for each copy session.

The copy source administration node is a node that manages the copy source area and the map information in the copy source area (which corresponds to the meta information 210) corresponding to a range of data for the single copy (the real data/the user data 208). The copy destination administration node is a node that manages the copy destination area corresponding to the range of the data for the single copy (the real data/the user data 208) and the map information in the copy destination area (which corresponds to the meta information 210).

Hereinafter, for convenience, the descriptions will be provided while the nodes 111, 113, 121, and 123 are respectively set as the session management node, the copy source administration node, the copy destination administration node, and the data storage node. In addition, the descriptions will proceed while all of the nodes 113, 121, and 123 have the same hardware and software stack as those of the node 111. The following processings by the nodes 111, 113, 121, and 123 are mainly executed by the processor 111b.

(S201) The node 111 refers to the copy bitmap 213 in accordance with the copy starting instruction and searches for part where the copy is uncompleted in the copy range. Subsequently, the node 111 determines a copy starting position. The node 111 also refers to the copy bitmap 213 and specifies a range where a value "1" indicating uncompleted is described continuously from the copy starting position. The specified range is set as the copy range for this time.

(S202) The node 111 executes an exclusion setting of the copy range. New I/O to the copy range where the exclusion setting is made waits until the copy processing is completed.

(S203) The node 111 identifies the copy source administration node (the node 113) based on the starting position of the copy range and the copy range. Subsequently, the node 111 starts a communication with the node 113. The node 111 notifies the node 113 of an execution request of the copy processing (Req. 1) by this communication.

(S204) The node 113 determines whether or not the copy using the map information can be performed. For example, in a case where a boundary of the map information corresponding to the copy range of the copy source area and a boundary of the map information corresponding to the copy range of the copy destination area are matched with each other, the node 113 determines that the copy using the map information can be performed.

In the example of FIG. 18, a range of the logical addresses IgAdd #00, #01, and #02 in the map information of LUN #0 becomes the copy range of the copy source area. A range of the logical addresses IgAdd #10, #11, and #12 in the map information of LUN #1 becomes the copy range of the copy destination area. A boundary on the LUN #0 side is IgAdd #00 and IgAdd #02, and a boundary on the LUN #1 side is IgAdd #10 and IgAdd #12. Both of the copy ranges are sizes including the continuous three logical addresses, and a correspondence relationship between the boundaries is recognized.

In a case where the copy using the map information can be performed, the processing proceeds to S205. On the other hand, in a case where the copy using the map information is not to be performed, the processing proceeds to S215.

(S205) The node 113 functioning as the copy source administration node reads out the map information corresponding to the copy range of the copy source area. The node 113 can specify a location where the data in the copy range is stored by referring to this map information.

(S206) The node 113 refers to the map information and specifies the data storage node. In this example, the node 123 is specified as the data storage node. The node 123 performs a communication with the node 123 specified as the data storage node. The node 113 notifies the node 123 of a processing execution request (Req. 2) with respect to the user data 208 set as the copy target by this communication.

(S207, S208) The node 123 functioning as the data storage node records information of the copy destination area (for example, the LUN and the LBA of the copy destination area) in the reference information 207 of the user data 208. Subsequently, the node 123 returns a response (Rsp. 2) with respect to the execution request (Req. 2) to the node 113 functioning as the copy source administration node.

(S209) The node 113 functioning as the copy source administration node specifies the copy destination administration node based on the copy starting position and the copy range. In this example, the node 121 is specified as the copy destination administration node. In this case, the node 113 starts a communication with the node 121 specified as the copy destination administration node. The node 113 transmits the map information of the copy source area to the node 121 that is to be notified of an update request of the map information (Req. 3) by this communication.

(S210, S211) The node 121 functioning as the copy destination administration node updates the map information corresponding to the copy range of the copy destination area based on the map information received from the node 113. Subsequently, the node 121 returns a response (Rsp. 3) with respect to the update request (Req. 3) to the node 113 functioning as the copy source administration node.

(S212) The node 113 that has received the response (Rsp. 3) from the node 121 functioning as the copy destination administration node returns the response (Rsp. 1) with respect to the execution request (Req. 1) to the node 111 functioning as the session management node.

(S213, S214) The node 111 functioning as the session management node sets the copy bitmap 213 corresponding to the copy range as OFF (sets the value corresponding to the logical address of the copy range as 0). Subsequently, the node 111 cancels the exclusion setting of the copy range. At this time point, it is regarded that the copy of the copy range is completed. When the processing in S214 is completed, the series of processings illustrated in FIG. 20 and FIG. 21 is ended.

(S215) The node 113 functioning as the copy source administration node or the node 121 functioning as the copy destination administration node executes regular copy (non-duplication exclusion copy) for actually reading and writing the data in the copy range between the physical areas (for example, the business pool 206a and the backup pool 206b) instead of the duplication exclusion copy using the map information illustrated in FIG. 18, FIG. 19, and the like.

When the processing in S215 is completed, the series of processings illustrated in FIG. 20 and FIG. 21 is ended.

Processing Flow: WRITE during Copy

Figure 22:
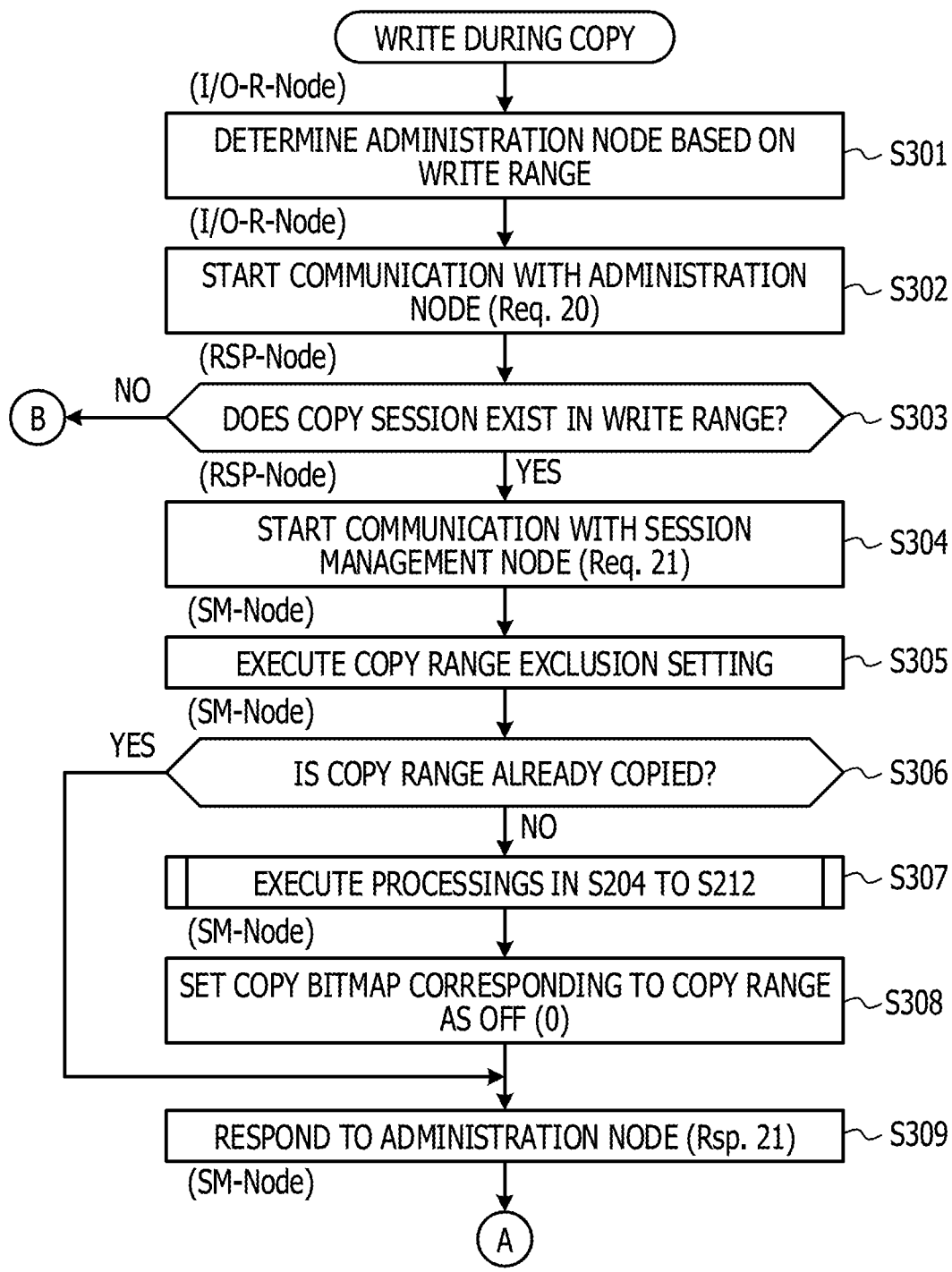
FIG. 22 is a first flow chart illustrating a flow of write I/O processing (WRITE during copy) during the duplication exclusion copy according to the second exemplary embodiment.

Next, a flow of the I/O processing during the duplication exclusion copy will be further be described with reference to FIG. 22 and FIG. 23. Here, the write processing during the copy will be described. FIG. 22 is a first flow chart illustrating a flow of write I/O processing during the duplication exclusion copy (WRITE during copy) according to the second exemplary embodiment. FIG. 23 is a second flow chart illustrating the flow of the write I/O processing (WRITE during copy) during the duplication exclusion copy according to the second exemplary embodiment.

Hereinafter, roles of the nodes 111, 113, 121, and 123 are further added. The roles to be added are a write I/O reception node and an administration node. The write I/O reception node is a node that has received the I/O request of WRITE I/O from the server 51. The administration node is a node that processes the I/O request from the server 51.

It is noted that the write I/O reception node may be referred to as I/O-R-Node and the administration node may be referred to as RSP-Node in some cases. Herein, the node 113 plays the role of the write I/O reception node as an example.

(S301, S302) The node 113 functioning as the write I/O reception node determines the administration node based on the WRITE range. In this example, the administration node is set as the node 121. In this case, the node 113 starts a communication with the node 121 functioning as the administration node. The node 113 notifies the node 121 of an execution request of WRITE during the copy (Req. 20) by this communication.

(S303) The node 121 functioning as the administration node determines whether or not a copy session exists in the WRITE range. For example, the node 121 refers to the copy bitmap 213 and determines that the copy session exists in the WRITE range in a case where part where the value corresponding to the logical address of the WRITE range is "1" (copy uncompleted) exists. In a case where the copy session exists in the WRITE range, the processing proceeds to S304. On the other hand, in a case where no copy session exists in the WRITE range, the processing proceeds to S316.

(S304) The node 121 starts a communication with the node 111 functioning as the session management node. The node 121 notifies the node 111 of an execution request of the WRITE I/O processing (Req. 21) by this communication.

(S305) The node 111 functioning as the session management node executes the exclusion setting of the copy range overlapped with the WRITE range. New I/O to the copy range with the exclusion setting waits until the copy processing is completed. It is noted that the copy starting position and the copy range can be determined based on the WRITE range and the value of the copy bitmap 213, for example.

(S306) The node 111 refers to the copy bitmap 213 and determines whether or not the copy range overlapped with the WRITE range has been already copied. In a case where the copy range is already copied, the processing proceeds to S309. On the other hand, in a case where the copy range is not already copied, the processing proceeds to S307.

(S307, S308) The processings in S204 to S212 of FIG. 20 and FIG. 21 are executed. Thereafter, the node 111 sets the copy bitmap 213 corresponding to the copy range as OFF (sets the value as "0").

(S309) The node 111 returns a response (Rsp. 21) with respect to the execution request (Req. 21) to the node 121 functioning as the administration node.

(S310, S311) The node 121 executes the WRITE I/O processing. It is noted that the execution of the WRITE I/O processing may also be performed by a node other than the node 121. The node 121 also starts a communication with the node 111 functioning as the session management node. The node 121 notifies the node 111 of an update request (Req. 22) of a difference bitmap (which will be described below) in the WRITE range by this communication.

(S312) The node 111 functioning as the session management node sets the difference bitmap in the WRITE range as ON (sets the value as "1"). The difference bitmap is a flag. In a case where the data in a state in which the copy is completed by using the map information but the copy between the physical areas (for example, the business pool 206a and the backup pool 206b) is uncompleted is updated, the flag indicates the updated part. For example, in a case where a value "1" indicates "update exists", the relevant range of WRITE during the copy may be specified by referring to the value of the difference bitmap.

(S313, S314, S315) The node 111 returns a response (Rsp. 22) with respect to the update request (Req. 22) to the node 121 functioning as the administration node. The node 121 that has received this response returns the response (Rsp. 20) with respect to the execution request (Req. 20) to the node 113 functioning as the write I/O reception node. The node 113 that has received this response returns the response with respect to the I/O request of WRITE I/O to the server 51. When the processing in S315 is completed, the series of processings illustrated in FIG. 22 and FIG. 23 is completed.

(S316) The node 121 functioning as the administration node executes the WRITE I/O processing as normal since no copy session exists. It is noted that a node other than the node 121 may also execute the WRITE I/O. When the processing in S316 is completed, the series of processings illustrated in FIG. 22 and FIG. 23 is ended.

The duplication exclusion copy according to the second exemplary embodiment has been described above. In the descriptions of the above-mentioned processing flow, the scheme has been presented in which the roles are respective allocated to the plurality of nodes as one of the exemplary embodiments, and the processings such as the duplication exclusion copy and WRITE during the copy are executed with the inclusion of the communications between the nodes. It is noted however that various modifications can be made to the contents of the roles administrated by the respective nodes, the allocation methods for the roles, and the like.

That is, it is possible to appropriately modify which node administrates which part among the processings of the duplication exclusion copy illustrated in FIG. 15, FIG. 16, FIG. 18, and FIG. 19 in accordance with the exemplary embodiments. In addition, the above-mentioned map information is information corresponding to the meta information 210, and the processings can proceed along the above-mentioned processing flow even in a case where the meta information 210 is used. The above-mentioned modifications of course belong to the technical scope of the second exemplary embodiment.

The second exemplary embodiment has been described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
a memory including a logical area and a physical area and configured to store meta-information for associating addresses of the logical area and the physical area with each other; and
a processor coupled to the memory and configured to:
read out first meta-information corresponding to a first logical area that is set as a copy source of data in the logical area from the memory,
specify a first address of the physical area corresponding to a copy source address of the data based on the first meta-information,
read out second meta-information corresponding to a second logical area that is set as a copy destination of the data in the logical area from the memory,
specify a second address of the physical area corresponding to a copy destination address of the data based on the second meta-information,
associating the first address and the second address with each other as storage areas of the data to indicate a storage of the data without copying the data to the second address of the physical area,
assign information related to the first logical area to the data when the data is written into the first logical area,
further assign information related to the second logical area to the data when the data is copied from the first logical area to the second logical area,
write the meta-information stored in the memory into the physical area when a data size of the meta-information reaches a predetermined size, and
generate position information indicating a position set as a write destination of the meta-information in the physical area.

2. The storage control apparatus according to claim 1, wherein the processor is configured to: associate the first address, with the copy destination address of the data, when new data is written at the copy destination address of the data in the second logical area before the associating is completed and associate the second address of the physical area set as a write destination of the new data with the address of the second logical area at which the new data is written based on the second meta-information.

3. A storage control apparatus comprising:
a memory including a logical area and a physical area and configured to store meta-information for associating addresses of the logical area and the physical area with each other; and
a processor coupled to the memory and configured to:
read out first meta-information corresponding to a first logical area that is set as a copy source of data in the logical area from the memory,
specify a first address of the physical area corresponding to a copy source address of the data based on the first meta-information,
read out second meta-information corresponding to a second logical area that is set as a copy destination of the data in the logical area from the memory,
specify a second address of the physical area corresponding to a copy destination address of the data based on the second meta-information,
associating the first address and the second address with each other as storage areas of the data to indicate a storage of the data without copying the data to the second address of the physical area,
write, when new data is written into the first logical area, the new data at a third address of the physical area different from the first address, and
associate an address of the data in the first logical area with the third address based on the first meta-information.

4. A storage control method of controlling a storage control apparatus including a memory having a logical area and a physical are and configured to store meta-information for associating addresses of the logical area and the physical area with each other and a processor coupled to the memory, comprising:
reading out first meta-information corresponding to a first logical area that is set as a copy source of data in the logical area from the memory;
specifying a first address of the physical area corresponding to a copy source address of the data based on the first meta-information;
reading out second meta-information corresponding to a second logical area that is set as a copy destination of the data in the logical area from the memory;
specifying a second address of the physical area corresponding to a copy destination address of the data based on the second meta-information;
associating the first address and the second address with each other as storage areas of the data to indicate a storage of the data without copying the data to the second address of the physical area;
assigning information related to the first logical area to the data when the data is written into the first logical area;
assigning information related to the second logical area to the data when the data is copied from the first logical area to the second logical area;
writing the meta-information stored in the memory into the physical area when a data size of the meta-information reaches a predetermined size; and
generating position information indicating a position set as a write destination of the meta-information in the physical area.

5. The storage control method according to claim 4, further comprising: associating the first address, with the copy destination address of the data, when new data is written at the copy destination address of the data in the second logical area before the associating is completed and associating the second address of the physical area set as a write destination of the new data with the address of the second logical area at which the new data is written based on the second meta-information.

6. The storage control method according to claim 4, further comprising:
writing, when new data is written into the first logical area, the new data at a third address of the physical area different from the first address; and
associating an address of the data in the first logical area with the third address based on the first meta-information.

* * * * *